United States Patent

Post

[15] 3,663,360
[45] May 16, 1972

[54] CONVERSION OF HIGH TEMPERATURE PLASMA ENERGY INTO ELECTRICAL ENERGY

[72] Inventor: Richard F. Post, Walnut Creek, Calif.
[73] Assignee: The United States of America as represented by the United States Atomic Energy Commission
[22] Filed: Aug. 13, 1970
[21] Appl. No.: 63,582

[52] U.S. Cl. ............................................176/3, 176/1, 310/3, 310/10, 310/11
[51] Int. Cl. ...........................................................G21b 1/00
[58] Field of Search.................................310/3, 5, 6, 11, 10; 176/1–5

[56] References Cited

UNITED STATES PATENTS

| | | | |
|---|---|---|---|
| 2,580,021 | 12/1951 | Hart | 310/3 R |
| 3,462,622 | 8/1969 | Cann et al. | 310/11 |
| 3,500,077 | 3/1970 | Post | 310/11 |
| 3,569,751 | 3/1971 | Ruhnke | 310/10 |

Primary Examiner—Reuben Epstein
Attorney—Roland A. Anderson

[57] ABSTRACT

High temperature plasma is produced in a containment zone of a controlled fusion reactor defined by a magnetic containment field from which field plasma emerges as a beam. The plasma beam is directed through the magnetic field of an expander which expander field is coupled to the containment field and diminishes in intensity therethrough so that rotational energy of the plasma ions is converted to translational kinetic energy. An arrangement is provided at the outlet of the expander to separate electrons from the high energy ions which ions are then directed into a collector structure. The collector structure comprises a plurality of stages maintained at progressively higher positive potentials wherein the ions are progressively decelerated so that successive fractions of the ions passes residual kinetic energies less than the differential potential between successive collector stages. The collector stages are provided with a deflector means which selectively deflects the ions with low residual kinetic energies to impinge upon collector plates to create electrical current at the stage potential. In one disclosed embodiment the selective deflector means utilizes a vapor jet charge exchange arrangement, in a second, the selective deflector means is an arrangement using crossed electric and magnetic fields, and, in a third, the selective deflector means utilizes particle focussing lenses. Electrical circuitry means are provided for combining and/or converting the individual collector currents for delivery to an electrical distribution system with means to establish the initial decelerating or retarding potentials.

17 Claims, 11 Drawing Figures

INVENTOR.
RICHARD F. POST

Patented May 16, 1972

INVENTOR.
RICHARD F. POST
BY

INVENTOR.
RICHARD F. POST

INVENTOR.
RICHARD F. POST

INVENTOR.
RICHARD F. POST

INVENTOR.
RICHARD F. POST

Patented May 16, 1972

INVENTOR.
RICHARD F. POST

BY

INVENTOR.
RICHARD F. POST

CONVERSION OF HIGH TEMPERATURE PLASMA ENERGY INTO ELECTRICAL ENERGY

BACKGROUND OF THE INVENTION

This invention was made under, or in the course of, contract No. W-7405-ENG-48 with the United States Atomic Energy Commission.

Controlled fusion reactors of a wide variety generally include an electromagnetic coil system for producing a magnetic containment field, i.e., a magnetic field defining a zone adapted for the containment of charged particles. Also, in such reactors, a means is generally provided for directing energetic light nuclide fuel particles into the containment zone to be trapped in an ionized form together with neutralizing electrons to produce a high temperature fully ionized gas or plasma therein. Provided that the particle density is adequate, for example, $10^{14}$ to $10^{18}$ particles/cc, the plasma temperature is of a sufficiently elevated level, i.e., of the order of 5 Kev to at least 500 Kev and the plasma is confined for an adequate period of time, e.g., above about 0.05 seconds, certain light nuclide fuels, e.g., D, T, $He^3$ and mixtures thereof, undergo fusion reactions at a rate in excess of the power required to maintain the reaction or even to greatly exceed the input power and all associated losses. The possibility of using the excess power for utilitarian purposes then arises. Heretofore, it has usually been proposed to recover the power by some form of a thermal cycle. With deuterium and the reaction confined to the DD reaction about 80 percent of the energy appears in the form of energetic neutrons and 20 percent resides in the form of energetic charged particles. With other fusionable fuel reactants greater proportions, up to 100 percent, appear in the form of the kinetic energy of charged particles. The neutron energy may be recovered in a blanket incorporating a heat exchange system, which blanket may also be a neutron-multiplying and/or breeder blanket including a fertile material for breeding fusionable, fissionable or other desired materials, e.g., a blanket containing sodium and beryllium which provides additional energy neutron capture reactions. The energy of the charged particles with any radiant energy generated in the reaction plasma is usually delivered to vacuum or other walls exterior to the plasma containment zone wherefrom it is to be transported by heat exchange media to an external heat exchanger to be dissipated, used in a thermal electric power generating system, etc., together with the thermal power generated in the blanket region.

Unfortunately, the efficiencies of such thermal power recovery systems lie below the Carnot power cycle efficiency appropriate to the working and exhaust temperature, i.e., to efficiencies of the order of 40 percent for practical systems. Now, however, it may be noted that the charged particles are at a temperature, $T_f$, of the order of $10^{8°}$ to $10^{8°}$ K. With a 300° K., $T_0$, ambient heat rejection temperature, the Carnot efficiency $N_o = 1 - (T_o/T_f) \cong 1 - 3 \times 10^{-6}$ or in excess of 99 percent of theoretical. A Carnot cycle system implies that the high temperature medium is in thermodynamic equilibrium, i.e., with the gas considered to be in a fully disordered state with a Maxwellian particle velocity distribution therein. However, particle velocity distributions in a fusion plasma may not necessarily be in equilibrium and may possess a distribution even more favorably conducive to power generation. A system by which it would be possible to convert any such particle kinetic energy directly into electrical energy, without resort to a thermal cycle, would make it possible to recover the energy at efficiencies approaching 99 percent dependent on the operating losses therein. Moreover, the energy of unreacted fuel particles could be recovered more efficiently for possible recycle to reduce the net energy required for injection of fuel particles. Also, the provision of fusion fuel reactants yielding a higher proportion or all of the reaction energy in the form of charged particles could substantially reduce or eliminate the necessity for heat exchange systems and, also, to eliminate or minimize thermal pollution of the environment in the vicinity of the reactor.

SUMMARY OF THE INVENTION

The present invention relates, in general, to the conversion of the kinetic energy of charged particles into electrical energy and, more particularly, to the direct conversion of the kinetic energy of high temperature plasma particles including energetic controlled fusion reaction product particles into electrical energy.

In summary, the invention contemplates the use of a plasma source of any type which is capable of delivering the requisite quantity of energetic ions with or without electrons. In practice the plasma source may be a controlled fusion reactor which reactor generally includes means such as electromagnetic coil structures for producing a magnetic field in an evacuated housing. The magnetic field of such reactor has a configuration and intensity distribution appropriate to define a containment zone in which charged particles may be confined to produce a high temperature plasma. A fusion plasma may be produced therein by any of a variety of known techniques such as by ionization and heating of electrically neutral materials comprising or containing fusionable light nuclides, injection and trapping of energetic charged particles as by manipulation of the magnetic fields, injection of energetic neutral or energetic molecular ion particles composed of fusionable light nuclides which are further ionized in the region of the containment zone so that the resulting ions are trapped in the containment zone. Charged plasma reaction products and unreacted charged fuel particles which are not trapped upon injection generally emerge or can be caused to emerge preferentially in certain directions from the containment zone, e.g., axially as narrowly defined streams or beams from certain "open-ended" systems or in sheet-like streams from peripheral regions of spheroidal, disk-like and certain other containment field configurations. The areas of particle escape are usually associated with one or another kind of so called "magnetic mirror" field regions of the containment field.

The kinetic energy, $W$, of the various charged particles emerging from exterior or fringing field regions of the containment field, particularly that of the positively charged ions, generally includes a substantial rotational component, $W \perp$ in addition to a translational component $W \parallel$. For most efficient conversion of the kinetic energy it is necessary that the rotational component, $W \perp$, be converted into translational energy $W \parallel$. For this purpose, in accordance with the teachings of the invention, there is provided an expander having an evacuable housing which includes an entrance part adapted to connect with the reactor housing at a location appropriate for admitting the plasma beam or stream therein. Electromagnetic field coil means are disposed in proximity to or circumjacent the expander housing to create a magnetic field which field blends with the fringing field of the reactor to provide a smooth transition to the field regions located in the expander housing.

More particularly, the expander magnetic field has a relatively high magnetic field intensity in the transition region at the inlet to the expander housing such entrance field intensity approximating that of the fringing field of the reactor plasma source. The magnetic field pattern within the expander is arranged to include magnetic field lines parallel to the enclosure walls to guide the plasma beam or stream from the entrance through the expander housing along a pathway out of contact with the walls thereof. Moreover, the ampere turns distribution of the electromagnetic coil means is made to diminish from the entrance to exit regions of the expander so that the magnetic field intensity within the expander progressively decreases along the beam path. The plasma, in traveling through such a decreasing intensity magnetic field gradient, undergoes an adiabatic expansion with the result that the rotational energy of the particles, $W \perp$, is converted to translational energy, $W \parallel$, with the translational energy of the particles then representing substantially all of the kinetic energy of the particles.

Means for converting the translational energy of the particles is provided in the form of an energy conversion section provided in an evacuated housing extension of the expander housing. In the event that the expanded charged particle beam contains a significant proportion of electrons in admixture with the positively charged particles, as may usually be expected when a fusion reactor is employed as the plasma source, it is necessary to provide means for separately collecting the ions and electrons. Separation of the ions and electrons may conveniently be done by causing the expander guide field to diverge sharply outward from the beam path in the exit region of the expander. The electrons having a much higher charge to mass ratio than the positive ions follow the diverging field lines away from the original beam plasma path; however, the heavier plasma ions experience a momentary impulse to follow but have sufficient momentum to cross the diverging field line region and continue along substantially the original beam path extended into the collector current generating section. The electrons can be collected by a single collector stage or a progressive series of stages as for the ions as described hereinafter.

The electrical current generating section of the apparatus comprises at least a plurality of individual collector stages arranged in sequence along the positive ion beam path. A positive retarding potential, which is progressively increased from stage to succeeding stage, is applied to the individual collector stages arranged in sequence so that the positive ions are progressively decelerated in traversing the collector structure. The number of sequential stages may be determined by the efficiency desired in conversion and, by other considerations, such as the energy spread and the kinetic energy of the most energetic particles in the beam. The potential difference between successive stages is determined as the energy interval in which particles in said beam are to be collected. It will be appreciated that the kinetic energy of the positive ions in a plasma generally is not monoenergetic. Instead the kinetic energies may cover a quite wide range best represented by a distribution function determined by various operating conditions. For a plasma in true equilibrium the distribution of the kinetic energies would be a normal "Maxwellian" bell-shaped distribution. In practice, a skewed distribution is usually obtained. Also, distribution of the particle energies in the beam may be modified or determined by the conditions prevailing in the exit area of the reactor containment, e.g., by loss cone characteristics in the area from which the particles emerge from the containment field. In practice, the number of stages employed may range from about 10 to at least about 100 with the incremental voltage differential between stages being in the range of about 5 kilovolts to about 75 kilovolts.

With such a sequence of collector stages having incrementally increased positive potentials applied thereto a fractional proportion of positive ions with an energy ranging from a level just sufficient to overcome the effective deceleration-retarding potential of a particular stage to those having kinetic energies barely inadequate to overcome the deceleration potential of the next succeeding stage, will slow to a stop or reverse the direction of travel in the vicinity of said particular stage.

The remainder of the ions in the beam continue along the beam path until a deceleration energy interval of similarly appropriate deceleration potential level is attained. In accordance with the invention, an energy sensitive means is provided in each collector stage to selectively deflect the fraction of ions slowed and/or reversing travel in the potential interval between stages to impinge upon collector electrodes provided in the respective collector stages. At the collector electrode the positive ions combine with electrons from the electrode resulting in electrical current flow, with an effective voltage equivalent to the deceleration voltage of the stage. Moreover, the energy loss by such a collection system comprises the relatively small residual kinetic energy remaining with the ions retarded as described. By selection of an appropriate number of stages and commensurate deceleration potential intervals, the loss caused by dissipation of the residual ion kinetic energy impinging on a collector surface can be made as small as desired.

In one embodiment of the invention, the energy sensitive collector means comprises a means for creating a stream of neutral gas or vapor flowing transversely across the ion beam to undergo charge exchange preferentially with ions of the beam having a low residual kinetic energy, e.g., below 10 Kev with a 10 Kev potential interval between stages. A charge exchange material which has a high charge exchange reaction cross section below 10 – 15 Kev is used and the charge exchange ion continues its line of travel across the ion beam to impinge on a collector surface.

In a second embodiment of the invention, electrostatic lenses, e. g., periodic acceleration-deceleration electrodes, are associated with each of the respective stages. The lenses are designed to "focus" or guide ions with kinetic energies in excess of the collector stage interval potential, e.g., 10 Kev, through the stage while ions with lower kinetic energies, i.e., below about 10 Kev are "over focussed" so as to be deflected to impinge on a collector surface in the respective stage.

In a third embodiment of the invention, means are provided for establishing a low level magnetic guide field with a direction along the charged particle path. Also electrodes having an electrical potential applied thereacross are disposed in spaced parallel relation across the ion beam path in each collector stage to establish an $E \times B$, i.e., crossed electric and magnetic, field which is effective to direct the low residual kinetic energy ions, e.g., below 10 Kev, to a collector surface in the respective stage.

It may be noted that the foregoing collector arrangements, in effect, sort out or analyze ions in the beam into discrete low residual kinetic energy groups to provide for most efficient conversion of their kinetic energy into electrical energy.

Circuitry is provided for applying the sequentially increasing deceleration potentials to the collector stages and for converting the generated electrical current into a form appropriate for delivery to a conventional electrical power distribution system.

Accordingly, it is an object of the invention to provide a high temperature plasma device with means for directly converting the kinetic energy of the charged particles therein to electrical energy.

Another object of the invention is to provide a controlled fusion reactor with a means for converting the kinetic energy of high temperature plasma ions therein directly into electrical energy.

Still another object of the invention is to provide apparatus for converting the kinetic energy of a high temperature magnetically confined plasma directly into electrical energy wherein an expander section having a diminishing magnetic field intensity therealong is used to convert rotational energy components, $W \perp$, of the ions into translational energy, $W\|$, and wherein the ions are passed through a converter section wherein the ions are decelerated in a sequence of collector stages by a positive potential increasing incrementally from stage to stage and wherein ions of a defined residual energy range are selectively collected at particular stage potentials.

Other objects and advantageous features of the invention will be apparent in the following description and accompanying drawings, of which:

Figure 1:
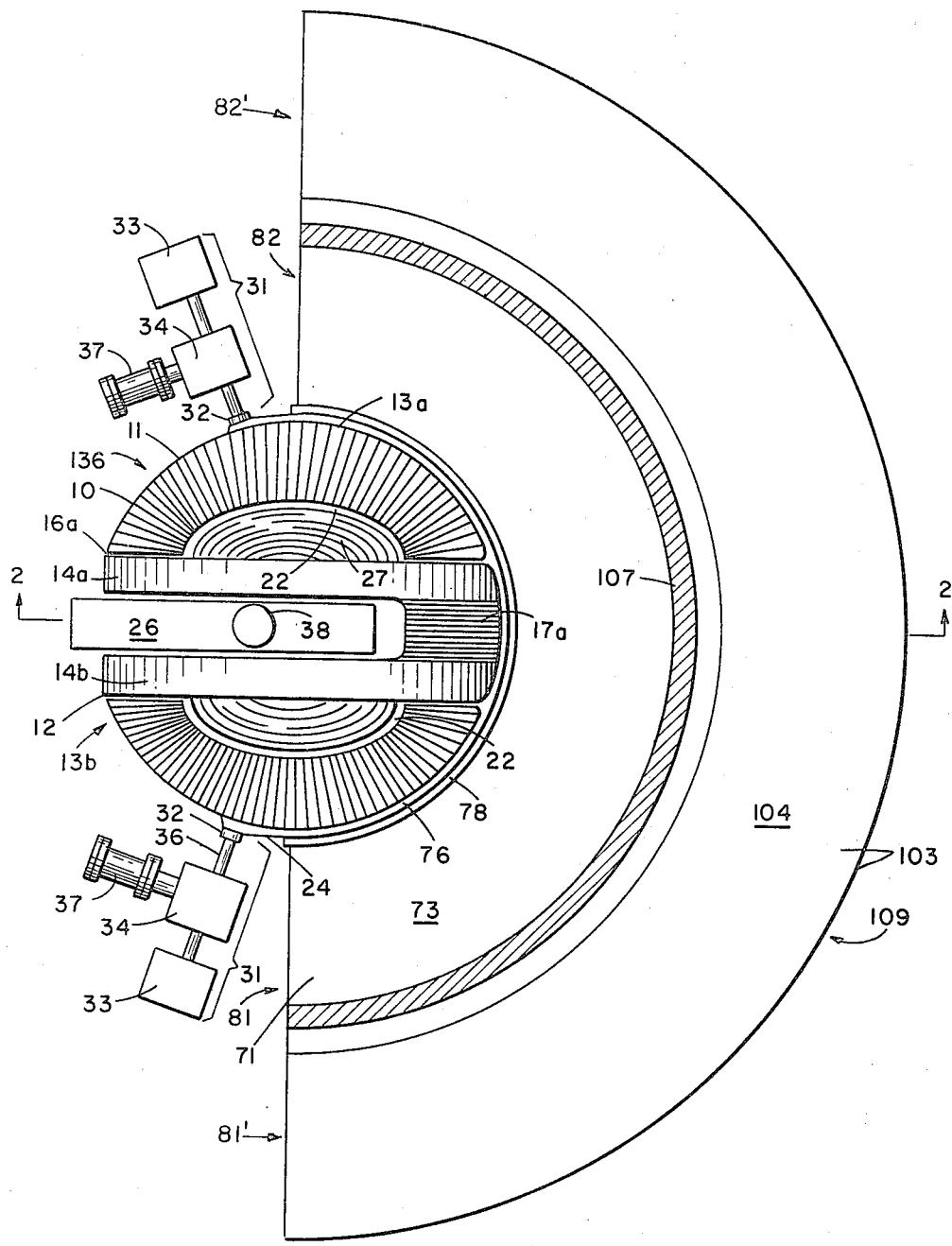
FIG. 1 is a plan view of a high temperature controlled fusion reactor device adapted for conversion of the kinetic energy of plasma ions into electrical energy.

The principles of the invention can be applied to the conversion of the kinetic energy of the particles of any type of high temperature plasma and is particularly adapted to the efficient conversion of such energy from a high temperature plasma in which the kinetic energy of the particles have a distribution covering a wide range of energies. It is generally preferred that the source of the high temperature plasma, e.g., a controlled fusion reactor or device, deliver or that the particles escape therefrom as a stream or beam of energetic plasma particles along a preferentially defined pathway or that the plasma source be adaptable to deliver such particles along such a preferential pathway. Such a preferential escape or emission pathway is characteristically provided by "magnetic mirror" portions of the magnetic containment fields used in controlled fusion reactors. Magnetic mirror field regions are generally characterized by a gradientially increased magnetic field intensity, i.e., the field lines tend to converge toward a line or surface proceeding from an inner containment zone to a mirror peak field region. The magnetic field lines diverge in exterior "fringing portions" of the field. The plasma particles emitted or escaping from the containment zone tend to follow such field lines and to escape along a pathway including the line or surface of convergence. Examples of such "magnetic mirror" fusion devices include the so called "Pyrotron" which uses a containment field generally having a central axially symmetric containment zone of uniform intensity with terminal gradientially intensified "magnetic mirror" field regions. Particles escaping from such a containment zone tend to follow preferential pathways, of columnar or diverging conical configurations, axially through the mirror field regions. With other type mirror fields, e.g., a radial mirror field region such as exists in "cusp," minimum B or multipoloidal spherical containment field systems, sheet-like or fan-like beams may be produced. The latter spherical configurations are represented by so called baseball seam electromagnet devices and by the so called "yin-yang" electromagnet coil device described more fully hereinafter.

Thermonuclear fusion reactions which yield energetic charged particle products, the kinetic energy of which can be utilized for electrical current generation, include the following:

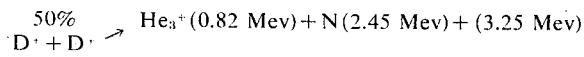
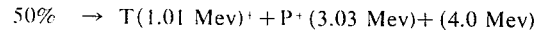

If the reaction is continuous, the $He^3$ and T react further as follows:

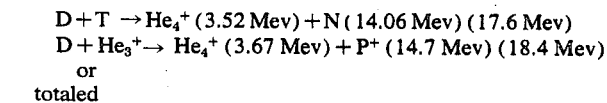

or totaled

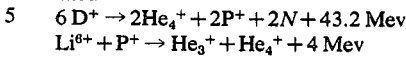

$Li^{6+} + P^+ \rightarrow He_3^+ + He_4^+ + 4$ Mev

The latter two reactions (above) can also be used, e.g., by injecting 50:50 mixtures of D and T or D and $He^3$ while the $DH_e^3$ reaction is seen to yield only charged reaction products, i.e., an energetic alpha particle and an energetic proton. Per deuteron reacting in the overall reaction 4.43 Mev of energy appears in the form of charged particles ($He^{3+}$, $He^{4+}$, $T^+$ and $P^+$) while the neutrons carry off about 2.76 Mev of the energy. Deuterium can also be used, e.g., with 10–30 percent (20 percent typically) in a breeding cycle productive of $He_3$. $He_3$ is added initially and the amount added from an external source may be reduced as the $He_3$ produced in the reaction builds up.

A discussion of some of the many possible reactions and fuel cycles which can be utilized in a controlled fusion reaction is set forth in pgs. 59-100, "Plasma Physics and Thermonuclear Research," Vol. 2, Longmire, Tuck and Thompson, Progress in Nuclear Energy, Series XI.

PLASMA SOURCE-FUSION REACTOR

Figure 2:
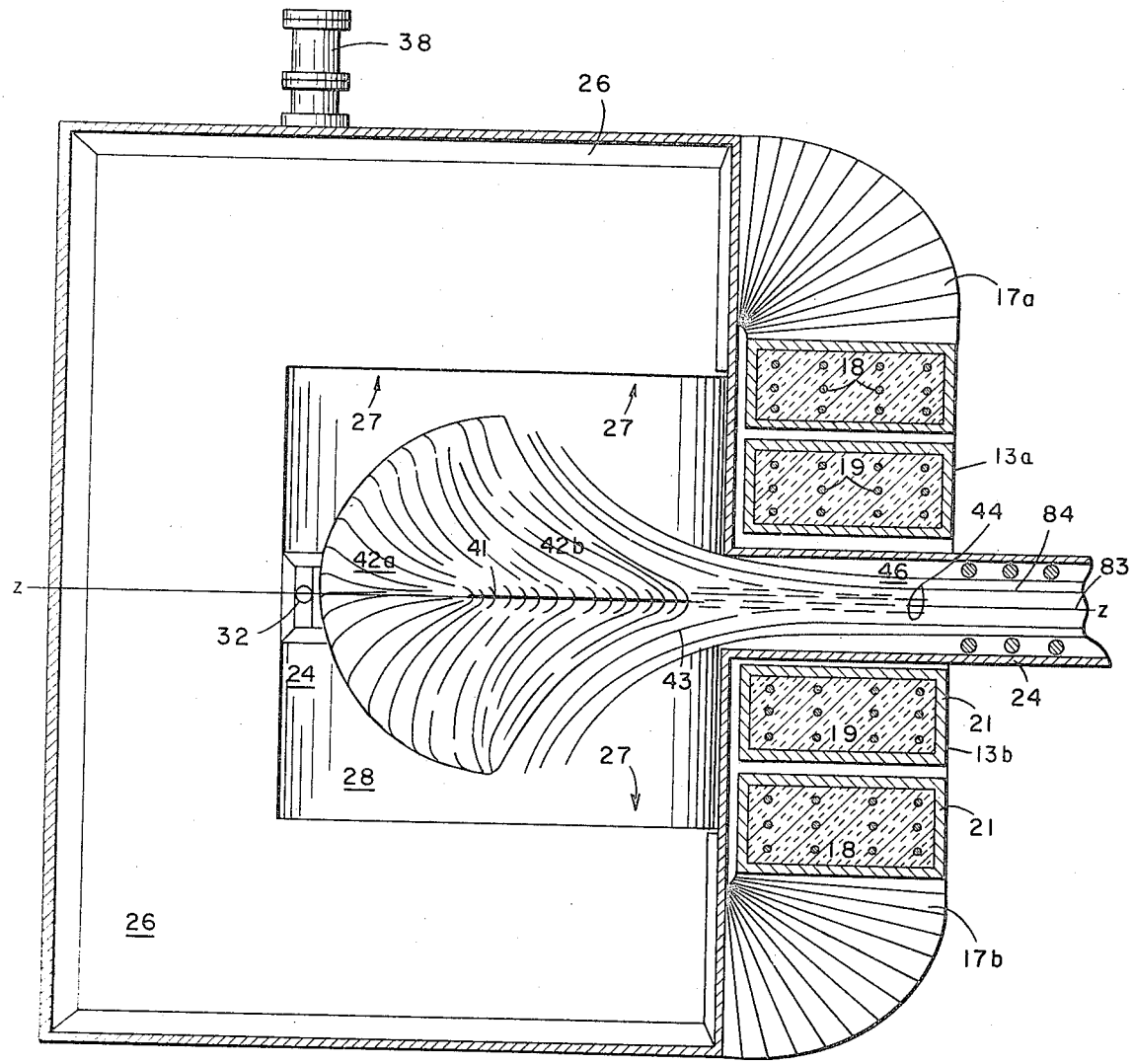
FIG. 2 is a vertical, sectional view of the controlled fusion reactor portion of the apparatus of FIG. 1 taken along the plane 2—2.

For purposes of describing the invention illustrative reference will be made to the production of electrical energy using a quadrupole magnetic field pattern type fusion reactor employing a so called "yin-yang" electromagnetic field coil of the type disclosed in the copending application of Richard F. Post and Ralph W. Moir, entitled "Electromagnetic Apparatus For Producing and Containing High Temperature Plasmas," Ser. No. 881,787, filed Dec. 3, 1969, now U.S. Pat. No. 3,582,849. See also: "'Yin-Yang' Minimum |B| Magnetic Field Coils", R. W. Moir, R. F. Post, "Nuclear Fusion," 9, 1969, pp. 253–258. Baseball seam electromagnetic coils, quadrupole and other systems can be used similarly. Such a yin-yang electromagnetic coil 10, as illustrated in FIGS. 1 and 2 of the drawing, includes a pair of similar C-shaped, coil segments 11 and 12, each of which includes a pair of spaced parallel sectors, i.e., 13a, 13b, 14a, 14b, respectively. Corresponding open ends of the sectors 13a, 13b, 14a and 14b are joined by transverse curved end portions 16a, 16b, 17a, 17b, respectively. In usual practice, the coil segments are wound unidirectionally with a continuous individual conductor 18 and 19, respectively, shown in FIG. 2. The yin-yang coil segments may enclose a generally spheroidal volume as shown in FIGS. 1 and 2 or the coil sections can be elongated in one dimension to define oblate spheroidal or generally cylindrical volumes. For economic reasons, cryogenic or superconductor windings may be used alone or in combination to attain the necessary containment field intensity. The coil segments 11, 12 may be constructed with a casing 21 of magnetically permeable material, e.g., aluminum, nonmagnetic stainless steel or the like, to provide support with the conductors being disposed in layers therein. Dependent upon the type of conductor utilized, the space between the conductors includes electrical insulation, spacers, if cryogenic cooling is used, and thermal insulation as in conventional practice. For cooling, the conductors may be hollow to allow circulation of a coolant therethrough from an exterior heat exchanger, etc. (not shown) or a coolant, e.g., cryogenic, may likewise be circulated by any appropriate or conventional means (not shown). Upon assembly the coil segments 11, 12 are arranged in a 90° rotated intersecting mirror image relation so that the curved end portions 16a, 16b and 17a, 17b are disposed facing across paired sectors 14a, 14b and 13a, 13b, respectively, in a symmetrical configuration. With such a configuration, the coil segments enclose a generally spheroidal volume 22.

A vacuum vessel may be provided in the form of a pair of rectangular boxlike portions 24, 26, inserted between the spaced parallel coextensive sectors 13a, 13b and 14a, 14b, respectively, in an intersecting relationship. Appropriately shaped shell members 27, e.g., spherical, cylindrical, or the like, segments, may be joined to the intersecting members, substantially approximating the peripheral dimensions or the spherical volume 22, to define a substantially spheroidal vacuum chamber 28 therein. The rectangular vessel portions define a vacuum chamber communicating therewith to which access may be gained through side or end portions of the rectangular box members which ends project beyond the coil sectors. If desired, energy multiplying blankets, breeding blankets, heat exchange arrangements, heat shields and the like (not shown) may be arranged within the volume 22 and/or chamber 28, adjacent the vessel walls, out of contact with the plasma formed as described hereinafter. The coil segments may be positioned within a rigid supporting framework (not shown) with provision, e.g., of clamping bolts (not shown) to offset the expansive forces produced by the magnetic field. Moreover, the coil segments can be enclosed in a rigid composite body (not shown), e.g., fiber reinforced laminating plastic or the like which can be made vacuum tight and evacuated to provide a "rough" vacuum below about 1 mm Hg to relieve the atmospheric pressure load on the vacuum vessel. The entire assemblage could also be enclosed in a large exterior vessel structure (not shown) similarly evacuated and which could be constructed, e.g., of prestressed concrete to provide radiation shielding if needed.

At least one source 31 is arranged to direct a beam of energetic neutral or molecular ion particles into central portions of spheroidal vacuum chamber 28, for example, through a port 32 located at an accessible corner of the rectangular box section 24 and/or 26, or in vessel shell members 27. Such a source, for injecting energetic neutral particles may include an ion source 33 directing ions such as $H_1^+$, $D^+$, $T^+$, $He_3^+$, $Li^+$ or various molecular ion combinations such as $D_3^+$, $He_3D^+$, etc., through a neutralizer-purifier-collimator arrangement 34 to produce corresponding energetic neutral particles which are directed along a beam guide tube 36 and through a port 32 as indicated above. The arrangement 34, in accord with conventional practice, may comprise vapor streaming neutralizer cells, beam collimators, baffles, at least one diffusion pump 37, a magnet coil arranged to deflect unneutralized ions from the beam, together with close-off valves and the like (not individually shown) as described, for example, in an article entitled "Cooperative Effects in a Tenuous Energetic Plasma Contained by a Magnetic Mirror Field," C. C. Damm et al., Physics of Fluids, Vol. 8, No. 8, August 1965, pp. 1,472–1,488. The neutral particle beams comprise energetic neutral fusionable isotope particles such as $H_1$, D, T, $He^3$, $Li^6$, alone or in admixture as appropriate for the fusion reaction desired.

If a D—D reaction is used, for example, the sources 31 may be arranged to inject D particles alone; however, if a DT, $DHe^3$, or $PLi^{16}$ reaction is used, one set of sources might inject energetic D or P particles while another set would then inject T, $He_3$ or Li particles, respectively. The energy of the particles may range upward from about 1 Kev, for example, at the beginning of injection to as high, e.g., up to 200 to 500 Kev, as necessary to attain a suitable reaction rate; that is, as the plasma density builds up, the energy of the injected particles may be increased to yield a plasma having a temperature appropriate to the desired fusion reaction rate. Such temperatures generally lie in the range of from about 30 Kev, e.g., with DT reactions or $DHe_3$, up to about 500 Kev. Temperatures in the range of 200 to 700 Kev may be used with D—D or D—D—$He_3$ reactions. Temperatures above about 500 Kev are needed, e.g., with $PLi^6$ reactions. It will be appreciated that the energy of the particles injected must be correlated with the density of the plasma to obtain the desired reaction rate. Allowance must be made for energy supplied by charged reaction products and energy lost by radiation transfer, in the form of energetic charged and neutral particles extracted or escaping from the plasma and the like, in accord with well known reaction theory. High energy particles may be utilized more effectively in the present conversion system than with systems in which the kinetic energy of escaping particles is not recovered since the energy of the injected particles is recovered, in large part, on the average, along with energy added by the heated plasma and/or fusion reaction. Moreover, unreacted fuel materials and fuel materials and other products produced in the reaction may be recovered by processing the effluent from the vacuum pumping systems, described hereinafter.

One or more vacuum pumps 38 are connected, e.g., to rectangular vessel section 26, with cryogenic or gettering type pumping arrangements (not shown) being similarly connected or otherwise mounted within the vacuum chamber as appropriate to produce the requisite vacuum conditions therein, i.e., below about $10^{-6}$ mm Hg and preferably below about $10^{-8}$ mm Hg to below $10^{-10}$ mm Hg.

In operating the foregoing reactor an electrical current from an appropriate source (not shown) is applied to the coil segments 11 and 12 to produce a quadrupole minimum $|B|$ magnetic containment field within the generally spheroidal chamber 28.

The containment magnetic field pattern produced in chamber 28 has a minimum intensity at the center 41, thereof, and the magnetic field strength increases in all directions therefrom. Also, the magnetic field intensity $|B|$ along a set of nested ellipsoidal surfaces extending outwardly from the center is a constant and the magnetic field strength increases outwardly therealong defining a containment zone for charged particles or plasma therein. Moreover, the magnetic field lines passing through the last closed contour of $|B|$ are curved convexly toward the plasma containment zone providing a stable magnetic containment configuration. Also, these field lines leave the containment field zone configuration by passing near the sector conductors providing a high magnetic mirror ratio, i.e., $R_{||} = B_{max}/B_{min}$, indicating that the magnetic field gradient increases at a rapid rate providing for an enhanced reflection of charged particles back into the containment zone. It may be noted that a filamentary approximation of the coil 10 can be fully specified by the terms R, the outer radius of the arcuate segments 11, 12; $\phi$ the arcuate angle subtended by the segments 11, 12, wherein $\phi$ may be an angle in the range about 180° to about 270°; and, h, the distance between a median plane between sectors 13a, 13b or 14a, 14b and the outside dimension of said sectors; and $\Delta Z$, the displacement along the Z axis, shown in FIG. 2, of the effective centers of the arcuate sectors of segments 11 and 12 which produces a variation in the magnetic mirror ratio $R_{||}$ over a range of at least 1.5 to 7.0. The magnetic field configuration produced by such a coil can be calculated using analytic approximations or using computers, for example, utilizing the "MAFCO" Code as disclosed in the above-cited application and publication of Post and Moir. The "MAFCO" Code is also disclosed in Report UCRL 7744 of the University of California Radiation Laboratory, Rev. II, 1966, authored by W. A. Perkins and J. C. Brown and is written in FORTRAN language suitable for computation with a wide variety of computers.

With one or more beams of energetic neutral particles injected from sources 31, as shown in FIGS. 1 and 2, the injected neutral particles are ionized by collision with background gas particles or plasma and are thereby trapped by the magnetic field defining the containment zone so as to increase the plasma density therein. It is preferable to mount and arrange the sources, e.g., on vessel sections 27, so that the neutral particle beam crosses the field lines to enter the containment zone in such a manner that the neutral particles are ionized more efficiently, by a Lorentz force mechanism, to be ionized and trapped in the containment zone. In either case, a plasma body 42 capable of undergoing a fusion reaction is disposed in the aforesaid containment zone, as shown in FIG. 2. The plasma body 42 is shaped by the magnetic field pattern defining the containment zone into generally semicircular or arcuate fan-shaped lobes 42a and 42b rotated 90° with respect to each other and joined along a common base plane. The plasma body 42 may be approximated by a spindle configuration divided along a plane passing through the spindle ends and with the halves rotated 90° with respect to each other. The magnetic field pattern, passing near the sector conductors as described above, provide a fan-shaped region 43 between coil sectors 13a, 13b, as well as a similar region (not shown) between sectors 14a, 14b. The magnetic field lines converge in region 43 toward a median plane between sectors 13a, 13b, as shown in FIG. 2, as well as toward a similar plane (not shown) between sectors 14a, 14b. It is into these convergent regions that the hemispindle-shaped plasma body portions intrude to afford the aforesaid fan-shaped lobes 42a and 42b. Plasma particle loss from the plasma occurs preferentially through the periphery of the fan-shaped lobes 42a, 42b forming a sheet-like fan-shaped plasma beam directed generally along said median planes between the respective coil lobe portions. With symmetrical magnetic field conditions the escape of plasma particles from lobes 42a and 42b is equally probable. To favor escape from lobe 42b, so that essentially all of the energetic particles escaping from the plasma body 42 appear in a plasma beam 44, the current in segment 12 is increased over that of segment 11 so that the mirror field intensity between sectors 14a, 14b is increased and more effectively reflects particles back into plasma body 42. Any other means of increasing the reflectivity of the mirror field region from which plasma loss is not desired may also be used.

The plasma beam 44 will comprise energetic ions corresponding to fuel particles injected into the reactor, reaction product ions and ions of extraneous materials entering or purposely introduced into the reaction zone and escaping therefrom together with electrons. Ions such as $H^+$, $D^+$, $T^+$, $He_3^+$, $He_4^+$, $Li_6^+$ and ions of any other material introduced or formed in the containment zone carrying at least a significant fraction if not all of the recoverable kinetic energy may appear in the plasma beam. Moreover, the ions in the beam may have an energy distribution ranging from a few Kev to at least about 1.5 Mev dependent on plasma reaction temperature, ambipolar potential, energy of injected particle, etc. At least a major proportion of the particle kinetic energy is in the form of a rotational kinetic energy component, $W\perp$, in the region 46 of peak magnetic mirror field intensity between sectors 13a, 13b, at which the ions escape from the containment field. The remainder is in the form of a translational energy component, $W||$. For purposes of the invention the rotational energy component must be transformed into translational energy as described hereinafter.

EXPANDER

Figure 3:
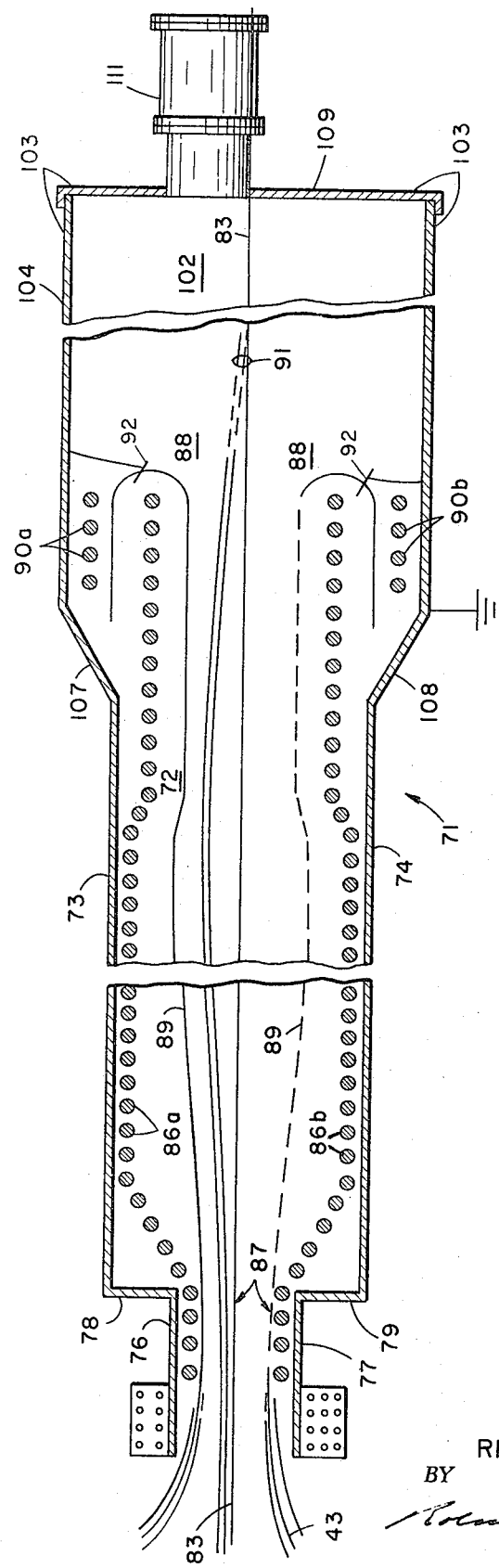
FIG. 3 is an enlarged vertical, longitudinal sectional view of the expander section of the device of FIG. 1.

In order to transform the rotational energy component, $W\perp$, of the ions into translational kinetic energy, $W||$, which would then represent the total kinetic energy of the particle, the plasma beam 44 is passed through an expander unit. The expander unit is constructed with a generally semicircular vacuum vessel 71 defining an annular section vacuum chamber 72 which is a radial extension of the portion of the reactor vacuum chamber which is included within rectangular vessel portion 24. More particularly, vessel 71, as shown in FIGS. 1 and 3, includes top and bottom arcuate sector wall portions 73, 74, joined along the inner radial margin to the outer semicircular ends of the upper and lower side portions 76, 77 of rectangular vessel member 24 by semicircular vertical wall sections 78, 79, respectively. Vertical wall sections 81, 82, join the ends of the arcuate wall portions and side portions of vacuum vessel member 24. In the form illustrated, the expander vessel is semicircular, i.e., occupies an arcuate sector of about 180°, to accommodate the angular width of plasma beam 44, i.e., a beam width of about 180°, provided by the particular reactor embodiment shown. A beam fan width as high as about 250° can be used, e.g., with the magnet sectors elongated in one dimension. Moreover, with other reactors, e.g., those that use a cusp field configuration, the expander might take a circular annular (360°) sector form or at the other extreme, i.e., with open ended magnetic mirror field configuration the expander may be of a cylindrical configuration or an arcuate sector of small divergence, e.g., less than 5° to 10°. With an elongated yin-yang or baseball seam magnet, arcuate sectors of up to 250° in a longitudinal axial plane might be used. In any event, the expander is shaped to accommodate the plasma beam produced by the reactor employed.

The plasma beam 44 passes or is guided through the expander generally in the vicinity of a median plane 83 between the top and bottom walls 73, 74 of the expander vessel. Means are provided for establishing a magnetic field having field lines 84, shown in FIG. 2, linking with those of the peak magnetic mirror field region 46 and extending radially through the expander vessel and symmetrically distributed with respect to said median plane 83. Such means may take the form of electrical conductors 86a, 86b arranged substantially in matching pairs in spaced relation across the median plane 83. The conductors 86 are curved to match the curvature of the expander vessel so that uniform arcuate magnetic field intensity contours exist along the annular width dimension of the expander vessel. The conductors 86 may be individual conductors arranged at the ends for connection to an appropriate D.C. power source (not shown) or the conductors may be wound as a solenoid adapted to be connected to a D.C. power source (not shown) and in either case may be supported by insulators or insulating frameworks (not shown) mounted on the vessel walls.

The ampere turns distribution of the conductors is arranged to provide an expansion field intensity matching that of the peak magnetic mirror field region 46, typically of the order of 100 to 250 kilogauss, and providing a smooth magnetic field transition region at the entrance aperture 87 of the expander. The ampere turns distribution along the plasma beam path through the expander vessel is arranged so that the magnetic field intensity decreases progressively along the plasma beam path to a low level, of the order of 300 to 700 gauss, 500 gauss typically, at the exit region 88 of the expander. The magnetic field lines 89 may represent the path of a typical field line extending through the expander. These values assure transformation of at least about 99 percent of $W\perp$ to $W||$. Where a lesser efficiency can be tolerated the terminal field value may have intensities of up to several thousand gauss. In the exit region 88 of the expander, the vessel height may be enlarged and a short section of conductors 90a, 90b may be arranged to overlay conductors 86a, 86b, respectively, therein. With this arrangement the field lines extending through the expander curve sharply outward in the exit region 88 of the expander.

With the lines passing through the progressively decreasing magnetic field region there occurs a transformation of the rotational energy component, $W\perp$, to translational, $W||$, in accord with usual magnetic mirror theory. This transformation may be represented by the formula $$W||(z) = W - W\perp(\theta)[B_{(z)}/B_{(o)}]$$

wherein $B_{(z)}$ = magnetic field intensity along the plane 83 in the expander, $B_{(o)}$ = field intensity at mirror peak, $W||$ = kinetic energy component parallel to field and $W\perp$ = rotational kinetic energy component of the particle. When $B_{(z)} \gg B_{(o)}$, $W||(z)$ approaches $W$, the total particle kinetic energy. Expansion to the point where $B_{(z)}/B_{(o)} = 10^{-2}$, for example, would assure that more than 99 percent of the particle kinetic energy would be translational kinetic energy. Also it may be noted that the density of the particles in the exit region of the expander has fallen to a very small fraction of that in the contained plasma body 42, i.e., typically by a factor of the order of $10^{-8}$ or less so that the beam particle fluxes will no longer be dominated by plasma behavior or space charge effects. The resultant densities in the exit region 88 will usually be of the order of $10^6$ particles/cc or less.

As the plasma stream passes through the exit region 88 of the expander, where the magnetic field undergoes a relatively abrupt diminishing intensity transition, the electrons therein are diverted sharply and follow the curved magnetic field lines whereat they may impinge upon a collector 92 connected to a load, if energy recovery is desired, or to ground as shown in FIG. 3, and positioned transversely across the curved magnetic field lines. The energy of the electrons, while recoverable in the same manner as for ions, is generally relatively inconsequential in the case of mirror contained plasmas so that recovery may not be warranted. In other cases a single collector or a series of varied potential collectors similar to the ion collectors may be used. The energetic ions, however, cross the curved field lines, experiencing only a small transverse "kick" and emerge as a pure ionic particle beam or stream 91 suitable for producing electrical current in accordance with the invention. Busch's Theorem can be used to calculate the transverse velocity component induced in a particle emerging from a uniform field $B_x$ into a zero or lower intensity field region. (c.f. J. R. Pierce, Theory and Design of Electron Beams, 2nd Ed., D. Van Nostrand, 1954.) Thin, negatively-charged grid wires (not shown) could also be positioned transversely across the beam path at the exit of the expander to repel the electrons and to allow the ions in the beam to emerge therefrom as the electron free ionic beam 91. Ions present in the beam exiting from the expander may include unreacted fuel particles, reaction products, protons, particles introduced into the reaction plasma to carry off reaction energy, etc.

The magnetic field intensity, $B$, in the expander unit may be decreased in several ways. The magnetic field can be reduced progressively from the higher intensity, e.g., 150 kilogauss, at the inlet aperture to the lower level of about 6 kilogauss in a matter of 10 to 15 meters and then in a matter of a few more meters to a lower level, e.g., 450 to 500 gauss, prevailing through most of the expander, about 70 meters of path, and finally ending with a slightly increased level, e.g., 600 gauss, in the region between conductors 90a, 90b of about 5 meters in length. The path of the beam 44, shown in FIG. 3, approximates that of a 500 Kev deuteron having a translational component, $W\|$, of about 478 Kev at exit of the expander. $B$ may also be decreased as indicated by the equation $B\ \alpha(1/R)$ where $R$ is the radius location within the expander vessel. In this case $B$ may be decreased progressively, requiring about 10 meters of beam path length to reduce $B$ by an order of magnitude.

EXAMPLE I

Illustrative parameters for a fusion reactor plasma-expander unit suitable for producing an ionic beam or stream 91 adapted for producing electrical energy as described hereinafter are set forth as follows:

| | |
|---|---|
| Fusion reactor plasma source (Yin-Yang coil or Baseball Seam electro-magnetic field coil type) | |
| Reaction chamber diameter | 3–4 meters |
| Plasma volume | ≈20–30 cubic meters |
| Minimum field intensity $B_o$ at center of containment zone with plasma | ≈50 kilogauss |
| Maximum field intensity, $B_{max}$ at mirror peak (edge of containment field) | 150 kilogauss |
| Mirror ratio $B_{max}/B_o$ operating | 3:1 |
| Mirror ratio $B_{max}/B_o$ initial | 2:1 |
| Ratio of magnetic field pressure to plasma pressure | $\beta = 0.5$ |
| Fusion fuel | Deuterium with 20% He$_3$ |
| Injected fusion fuel particle energy | 500 Kev (D) |
| Reactor plasma density | ≈10$^{14}$ particles/cc |
| Plasma temperature (mean particle energy) | 600 Kev |
| Power output of fusion reactor plasma source | 1000 MW(e) |
| Ambipolar plasma potential | 200 Kv |
| Exiting plasma beam particle mean kinetic energy | 800 Kev |
| Plasma beam particle energy distribution | 200 Kev to about 1.5 Mev |
| Inner radius dimension of expander chamber | ≈4–5 meters |
| Outer radius of expander chamber | ≈100 meters |
| Field intensity at inner radius of expander vessel (peak of mirror field) | 150 kilogauss |
| Thickness of plasma beam at entrance of expander (2h) | ≈10 cm |
| Magnetic field intensity at exit of expander | approx. 500 gauss |
| Plasma beam thickness at expander exit (2h) | 1 meter |
| Power in beam at expander inlet | approx. 1000 MW(e) |
| Power output | approx. 1.2 ×10$^3$ amps at 800 kilovolts |
| Current density at expander exit | approx. 400 μamp cm$^2$ |
| Expander area | ≈300 sq. meters |
| Space charge limited density at expander exit (edge of beam) | ≈2.6×10$^6$ cm$^3$ |
| Outward directed electric field (edge of beam) | ≈250 v/cm |
| Potential difference between midplane of beam and edge | ≈6 kilovolts |
| Ratio $W\|/W\perp$ at exit of expander | 0.005 |

COLLECTOR - ELECTRICAL CURRENT GENERATION

The electron free beam 91 obtained as described in the foregoing is directed in the vicinity of plane 83 into a collector assembly disposed in an annular vacuum chamber 102 defined in an annular vacuum vessel extension 103 of the enlarged portion of the expander vessel 71. More particularly, annular top and bottom plate wall members 104, 106, of the vacuum vessel defining the enlarged vacuum chamber exit region 88 of the expander and vacuum chamber 102, are joined by sloping wall members 107, 108, respectively, to top and bottom walls 73, 74, of expander vessel 71. The outermost curved margins of the wall members 104, 106 are joined in hermetic relation, e.g., by flanged joint and/or welding, to a curved end wall closure 109. The radial wall members 81, 82 of vessel portion 71 are extended as members 81′, 82′, respectively, as shown in FIG. 1, to serve as radial end walls for vessel portion 103. Reactor chamber 28, expander vacuum chamber 72 and collector vacuum chamber 102 are intercommunicated thereby defining, in effect, a continuous vacuum chamber. Diffusion or other high speed vacuum pumps 111 (one only shown) may be arranged along wall 109 communicating with parts therealong to evacuate vacuum chambers 72 and 102 as well as assist in evacuating the reactor chamber 28. Other pumping means (not shown) may be arranged near wall surfaces or elsewhere as convenient within chamber 102 and in chamber 72 to provide supplemental pumping, if necessary, to achieve an adequately low vacuum pressure, i.e., typically below about 10$^{-5}$ mm Hg, in the chambers 72 and 102. The supplemental vacuum pumping means may be "gettering" pump arrangements, cryogenically cooled wall pumping arrangements, ion pumping means, or any of the other high speed vacuum pumping means used in large vacuum chamber practice, e.g., those used to simulate space conditions and the like.

The ions in the plasma stream 91 have kinetic energies distributed over a wide range bounded, e.g., at the lower end, by the plasma potential, $\phi$, which accelerates the lower energy particles from the plasma body 42, and at the upper end by the exponential fall-off of the distribution of particle energies in a high temperature plasma as described above. For most efficient conversion of the kinetic energy of the ions at an electrode, it is required that each be decelerated to a very low residual kinetic energy prior to deposition at the collector electrode. Accordingly, the collector assembly disposed in chamber 102 generally comprises a plurality, N, of collector stages distributed sequentially along the path of ionic stream 91 and which collector stages are maintained at incrementally or progressively increased positive retarding potential levels over a range corresponding to the distribution of kinetic energies in the ionic stream 91. The magnitude of the potential increment determines the width of the interval of particle kinetic energies of the distribution of particle energies in the ionic beam 91 which is collected in a particular stage. The particles of said beam having an energy within said interval, i.e., in a range including those with sufficient energy to overcome the repulsive deceleration potential of the stage but with insufficient energy to overcome the incrementally increased potential of the next succeeding stage, are those which are collected in the individual stages. Potential increments of the order of 5 to 15 kilovolts (Kv) will assure most efficient operation while a larger increment, e.g., up to 50 kilovolts or more, may suffice, where the energy spread is large, to reduce the number of stages needed although some decrease in efficiency may result since the cost of construction can thereby be reduced.

Associated with each collector stage there is provided an ion deflection means which is adapted to selectively deflect those ions having a residual kinetic energy less than said potential increment away from the ion beam 91 to deposit or impinge upon an appropriate collector surface in the stage. The ions combine with an electron thereon generating an electrical current flow at the maintained potential of the collector electrode. They are accordingly collected at that electrode whose potential lies nearest below the ion's initial energy on emergence from the expander. The atomic particle thus formed may remain adsorbed on, imbedded in or it may escape as a neutral atom or, combined with a like atom, as a neutral molecule, from the collector surface without disturbing the electrical current flow. Specific details of various embodiments of the collector assembly are set forth hereinafter.

The theoretical collector efficiency of such an incrementally increased potential collector system, $\eta_c$, can be calculated from the following equation:

$$\eta_c = \frac{\sum_{j=1}^{N} W_j \int_{W_j}^{W_{j+1}} I(W) dW}{\int_{\phi}^{\infty} W I(W) dW}$$

where the distribution function in energy of the ion current is $I(W)$ and with $N$ collector electrodes.

In a rough approximation $$\eta_c \approx 1 - (1/N)$$

CHARGE EXCHANGE COLLECTOR ASSEMBLY

Figure 4:
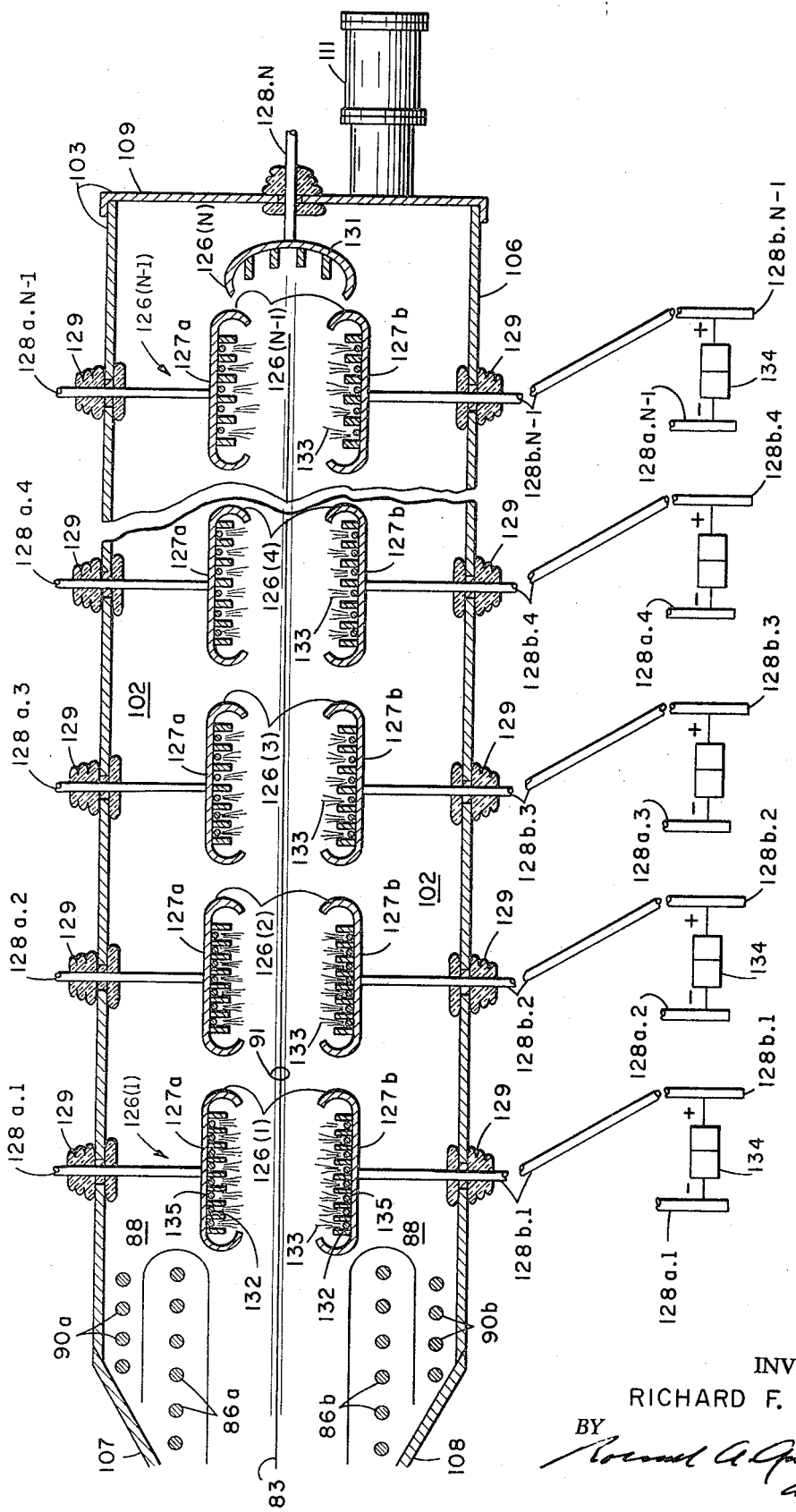
FIG. 4 is a vertical, longitudinal view of a first collector embodiment utilizing a charge exchange vapor means for selectively collecting the low residual energy particles in an ionic beam produced in the reactor-expander portions of the device of FIG. 1.

In a first embodiment i.e., the collector assembly, illustrated in FIG. 4, a plurality, N, of collector stages, 126 (1), 126 (2), --- 126 (N), are arranged sequentially along the path of ionic beam 91 in chamber 102. The collector stages, 126 (1), 126 (2), --- 126 (N−1), include similar electrode plates 127a, 127b, having a semicircular annular plate section configuration, i.e., an arcuate curvature annular plate section configuration generally corresponding to that of collector vessel section 103 and disposed in paired spaced parallel relation across the path of beam 91. The leading and trailing edges of the plates 127a, 127b are curved inwardly in reentrant relation wherefor the space therebetween will be substantially free of the electrical field produced by the potential applied thereto. The plates 127a, 127b, may be supported in insulated relation by means of a framework (not shown) mounted on the walls 104, 106, or by any appropriate equivalent means. Individual terminals, 128a.1, 128a.2, --- 128a.N−1 and 128b.1, 128b.2, --- 128bN−1 may be connected to collector plates 127a, 127b, respectively, and lead externally of vessel 103 through hermetically sealed insulator feedthrough bushings 129 mounted on walls 104, 106. The final collector stage 126N may take the form of a single curved plate 131 having the edges curved inwardly and mounted in insulated relation adjacent end wall 91 with the inner concave side thereof positioned to intersect and collect the portion of beam 91 remaining after passage through collector stages 126 (1) --- 126 (N−1). The collector plates 127(a)(b) may be provided with a series of parallel rib portions 132 projecting from the inner faces thereof which would tend to facilitate collection of the impinging ions thereon. The ribs 132 may lie transverse or, preferably, longitudinally along the collector faces as shown in FIG. 4. Moreover, a solid material 135 in rod, wire or similar form may be disposed at the bottom of the slot-like spaces between the ribs to serve as a source of the charge exchange vapor. Vapor 133 produced therefrom tends to emerge from the slot-like spaces between the ribs, e.g., of collector plates 127b, and diffuse as a collimated vapor stream across the path of beam 91 to deposit on the opposite collector plates 127a. Heating means, e.g., electrical heater elements (not shown) may be provided at the outer surface of the plates, to induce vaporization of the material 135 and establish an appropriate density thereof across the path of beam 91 to obtain the desired charge exchange with the ions in beam 91. Those ions having a selected residual energy level undergo charge exchange with neutral atoms of said material and the charge exchange particle proceeds transversely to deposit or be collected on the respective opposing collector plates 127a. Quantities of the charge exchange material may be provided on each collector plate 127a, 127b, and such plates may be heated alternately to provide extended periods of operation. Other arrangements may be used to provide the charge exchange vapor. For example, orifices may be provided in plates 127a, and/or 127b and vapor from a heated reservoir (not shown) provided on the rearward surface of plates 127a and/or 127b may be passed across the path of beam 91.

Neutral particles, i.e., atoms or molecules of the vapor of certain materials under appropriate target thickness conditions have a highly enhanced cross section for charge exchange neutralizing reactions with energetic ions having an energy below about 10 to 15 Kev as compared to the cross section for reactions with ions having energies above such low level. Among the materials having such a preferential charge exchange reaction cross section, under so-called thick target conditions, are Mg, Na and Li with which the charge exchange reaction cross section may range as high as a ratio of 100 times as great at low energies, i.e., below 15 Kev and especially below 10 Kev, at least for $H^+$ or $D^+$ equivalents, as compared to energies above these values. With Mg a typical charge exchange reaction with hydrogen would be represented by the equation:

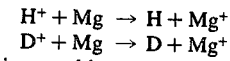

wherein the $Mg^+$ ion would proceed transversely to the beam and be deposited on a collector plate 127a or 127b to combine with an electron therefrom and thereby generating an electrical current.

Under thick target conditions, wherein the density $x$ length (micron cm) target dimensions are such that multiple collisions occur between the incident particles and the change exchange vapor particles, ionization reactions also occur. The cross section for ionization increases to a peak, e.g., at about 30 Kev, and then decreases at higher energies so that electron ion, i.e., $Mg^+ + e^-$, pairs are also produced in numbers exceeding the number of charge exchange ions $Mg^+$. Thick target conditions suitable for use with the charge exchange media mentioned above lie in the range of about 50 to about 500 $\mu$ cm (micron cm) thickness. Such thickness is calculated as the product of the density in microns of such medium times the length of the zone, i.e., width of the electrodes, occupied by the vapor and traversed by the vapor in each stage. The thickness of the target and materials suitable for use as the charge exchange medium may be calculated and determined from published literature sources such as report No. UCRL 18341 Rev.

In order to assure that the electron-ion pairs are removed from the space between the respective plates 127a, 127b, a small electrical potential is applied therebetween, from a power supply 134, i.e., of the order of 0.1 volt/cm, with the heated vapor emitting electrode plate 127b being positive and the cold electrode plate 127a being negative, as shown in FIG. 4. The electron-ion pair particles are then collected in equal numbers on the opposite polarity electrodes with the current flow therefrom through the aforesaid power supply canceling out. A similar result can be achieved by establishing a weak magnetic field in the space between the electrode plates 127a, 127b, using magnetic field generating means (not shown). The charge exchange ions, $Mg^+$, deposit on the electrode plates 127a, 127b, producing an electrical current at the potential at which the particular stage is maintained. More particularly, a positive potential beginning with a lower limit positive potential, $E_1$, and increased in progressive increments yielding successively higher potential, $E_2$, $E_3$, - - - $E_N$ are applied from a voltage divider supply described hereinafter to terminals 128b.1, 128b.2, 128b.3, - - - 128.N, whence they are communicated to collector plates 127a, 127b of the successive stages. The lower limit potential, $E_1$, is determined to be at a level at which a fraction of the lower energy ionic species in beam 91 possessing a significant fraction of kinetic energy is collected in stage 126 (1). The lower limit of the range of particle energies may be determined, in magnetic mirror machines, for example, by the ambipolar potential existing in the containment zone which is effective to expel positive ions therefrom. Ambipolar potentials of the order of at least 100 to 200 kilovolts may exist in such a system and, accordingly, $E_1$, may be of a similar magnitude. The successive voltages, $E_2$, $E_3$, - - - $E_N$, are then increased in increments, e.g., about 10 to 15 kilovolts, per stage, with a sufficient number, N, of stages to accommodate the range of particle energies in the ionic beam 91 so that successive fractions of increasingly higher kinetic energy ions are collected in the successive stages. The electrical currents generated by collection of the successive fractions of ions are available for delivery from terminals 128b.1, 128b.2, 128b.3, - - - 128.N and conversion to a convenient form as set forth hereinafter.

EXAMPLE II

Illustrative parameters for a charge exchange collector system for a reactor-expander unit described in Example I are as follows:

| | |
|---|---|
| Arcuate sector occupied by collector system | approx. 180° |
| Inner radius collector vessel | 100 meters |
| Beam ion energies (range) | 200 Kev to about 1.5 Mev |
| Beam ion energies (mean) | 800 Kev |
| Incremental voltage increase per stage | ≈15 Kev |
| Energy range | 1300 Kev |
| Number of stages | ≈87 |
| Beam thickness in collector system (2h) | ≈1 meter |
| Aperture between collector plates | >1 meter |
| Collector electrode width | ≈2 meters |
| Collector electrode spacing | ≈0.1 meter |

Power losses in collector estimated as low as 3 percent.

ELECTROSTATIC FOCUSING COLLECTOR ASSEMBLY

Figure 5:
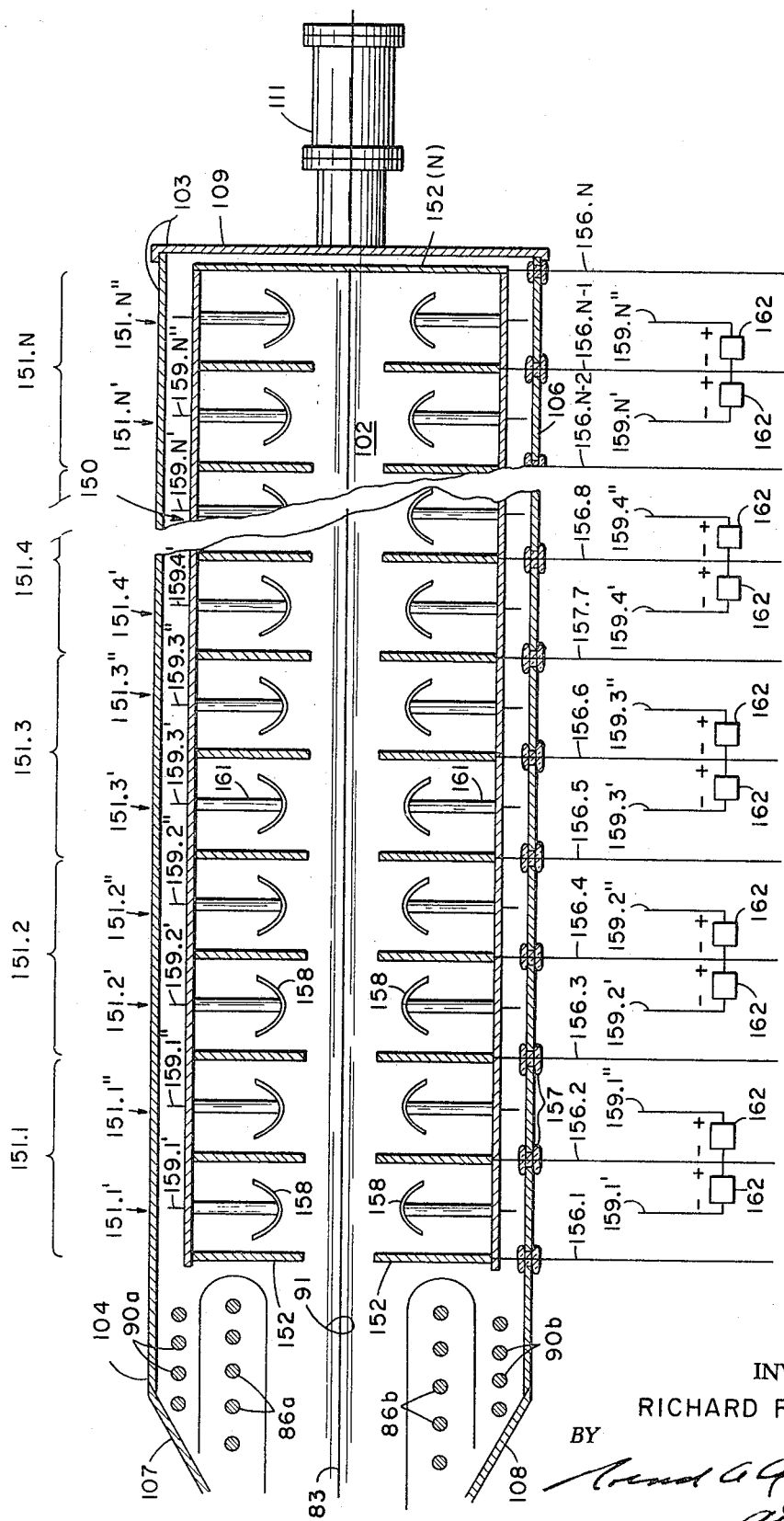
FIG. 5 is a vertical, sectional view of a second collector embodiment utilizing electrostatic focusing means for selectively collecting the low residual energy particles in an ionic beam produced by the reactor-expander portions of the device of FIG. 1.

In a second embodiment 150 of the collector assembly, illustrated in FIG. 5, a plurality, N, of collector stages 151.1, 151.2, 151.3 - - - 151.N, are arranged sequentially along the path of ionic beam 91, i.e., in chamber 102. Each half of such collector stages 151.1', 151.1'', 151.2', 151.2'' - - - 151.N', 151.N'', includes pairs of collector plates 152 positioned in parallel spaced edgewise relation transversely across the path of ionic beam 91 and defining between the proximal edges thereof a series of apertures through which the beam 91 passes. The collector plates 152 are curved along the longitudinal dimension and are disposed in spaced concentric mutual relationship at uniform radial positions corresponding to the curvature of collector vessel section 103. The last collector plate 152N may be a single plate extending across the beam path 91 to collect the residual beam. The collector plates may be mounted on elongated insulating support members 154 extending radially within vessel section 103 and forming part of a framework (not shown) mounted on the walls 104, 106. The collector plates forming said pairs may be connected by conductors (not shown) internally of vessel section 103 and terminal leads 156.1, 156.2, 156.3 - - - 156.N may be connected to plates 152 of collector stages 151.1, 151.2 - - - 151.N and led exteriorly of vessel 103 as through hermetically sealed feed-through insulator bushings or seals 157. Incrementally progressively increasing positive potentials $E_1$, $E_2$ - - - $E_N$ for progressively decelerating positive ions in ionic beam 91 as described above are applied to the terminals 156.1, 156.2, 156.3 - - - 156.N. Also electrical currents, produced by collection of positive ions impinging on the collector plates, are removed therefrom by conductor means connected to said terminals as described more fully hereinafter.

Electrostatic lens focusing means are provided in the intervening spaces between the successive electrode plates 152 on both sides of beam 91 in each stage 151.1, 151.2 - - - 151.N. The focusing means may comprise curved electrode plate members 158 to which a suitable electrostatic potential may be applied as illustrated in FIG. 5 of the drawing. The plate members 158 are arranged in pairs with the convex curved faces thereof disposed in facing relation across the path of ionic beam 91. Suitable electrostatic focusing potentials may be applied to said convex plate members 158 as through terminal leads 159.1', 159.1'' - - - 159N', 159N'' which may be led through members 161 used to support the convex plate members 158, e.g., and joined to support member 154, or the like. The terminals 159 are attached to the corresponding opposing curved electrode plate 158 pairs while the pair members may be connected together internally of chamber 102 or externally thereof. The focusing potential may be supported, at least initially, by power supplies 162 connected between alternate terminal leads 156.2, 156.4, 156.6, et seq., and terminal leads 159.1', 159.1'', 159.2', 159 et seq of the focusing electrode plate pairs in such a manner that the electrode plate 158 in the first half 151.1' of stage 151 is polarized negatively with respect to electrode 156.2 and that the electrode plate 158 in the second half of stage 151.1'' is polarized positively with respect thereto. Somewhat strong focusing can be obtained by separately energizing the two focusing electrodes disposed directly in opposition across with electrical potentials of opposing polarity. With this arrangement an alternating electric focusing field gradient, $E \uparrow$, $E \downarrow$, is produced along the beam path which is more effective in focusing the positive particles as indicated above.

Either of the foregoing polarization patterns is followed throughout the remainder of said stages wherefor there is provided a focusing means comprising a series of accel-decel electrostatic fields (not shown) provided by the lens electrodes in the respective half-stages and polarized in alternating fashion as described above adapted to focus ions above a selected residual kinetic energy level, e.g., in the range of about 25 Kev to about 75 Kev, proceed further along the collector until decelerated to below said kinetic energy level, while those having an energy below said energy level are selectively deflected to impinge on the collector electrodes 152 of the particular stage having a decelerating potential sufficient to reduce the initial kinetic energy below the selectively deflected level. Since some of the beam particles impinge on the focusing electrodes when the system is operating, a system might be provided to regulate the potential created thereby so that the energizing potential supplies for the focusing electrodes may be turned off when the system is operating.

Figure 6:
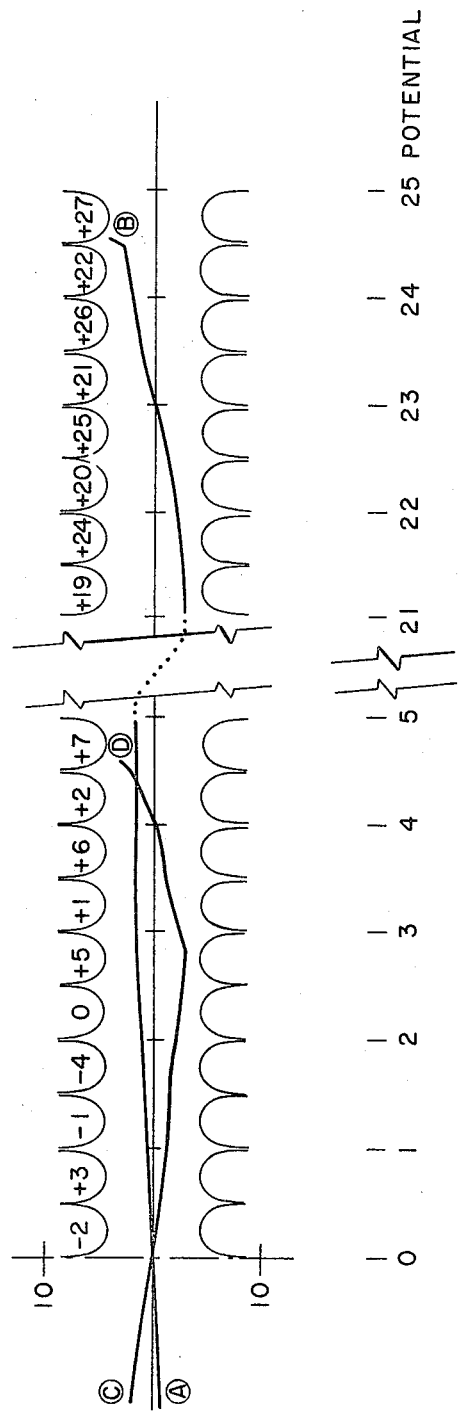
FIG. 6 is a schematic representation of an electrostatic focusing collector system of the type illustrated in FIG. 5, showing typical particle trajectories therein.

Typical particle trajectories for two different particles, i.e., A–B and C–D having initial relative particle energies of 5 and 25 units, are shown in FIG. 6 of the drawing. Such particle paths were calculated with particle parameters listed below for a 25 lens structure.

| | Particle A–B | | Particle C–D |
|---|---|---|---|
| $W_A$ | 25 units | $W_C$ | 5 units |
| $W_B$ | 0.6 units | $W_D$ | 0.27 units |
| Slope | 0.04 units | | −0.09 units | where
$W_A$ = Particle energy at A     $W_B$ = Particle energy at B
$W_C$ = Particle energy at B     $W_D$ = Particle energy at D and slope is the inclination of the initial particle path to the midplane 83. The values shown in FIG. 6 are relative voltages related to zero energy lower particle energy limit. For a case, e.g., with mirror machines where the ambipolar potential sets a limit, e.g., 200 Kev at the lower end of the particle energy range, one might use such a limit together with the upper limit of the particle energies to determine trajectories.

EXAMPLE III

Illustrative parameters for an electrostatic focusing collector system as described above and as described hereinafter for the reactor-expander parameters set forth in Example I are as follows:

| | |
|---|---|
| Arcuate sector occupied by collector system | ≈180° |
| Beam ion energies | ≈200 Kev to 1.5 Mev |
| Beam ion energies (mean) | ≈800 Kev |
| Incremental voltage increase per stage range (25 to 75 Kev) | ≈50 Kev |
| Energy range (1.5 Mev – 200 Kev) | 1300 Kev |
| Number of stages | 26 |
| Electrostatic focusing potentials | approx. ± 100 kilovolts |
| Beam thickness in collector system | ≈1 meter |
| Aperture between collector electrodes | Slightly greater than 1 meter |
| Collector electrode spacing | ≈1 meter |

Power losses in collector estimated to be as low as 3 percent.

ELECTROSTATIC FOCUSING COLLECTOR. MODIFICATION A.

Figure 7:
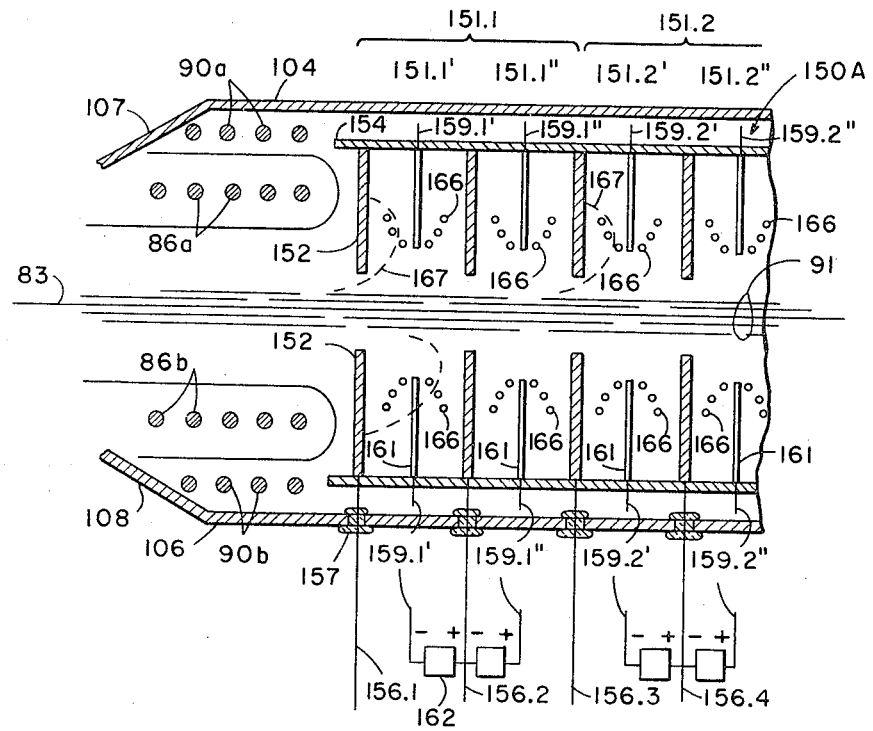
FIG. 7 is a partial vertical, sectional view of a modification of the electrostatic focusing collector system embodiment of FIG. 6.

A modification 150A of the second collector embodiment 150 is illustrated in FIG. 7 of the drawing. Modified electrostatic focusing collector assembly 150A is similar to collector assembly 150 except that the curved electrode plate members are replaced by a grid member 166 curved in the same manner as plates 158 but constructed as an open meshwork or grid. For example, a plurality of thin wire or rod spaced parallel members joined by thin cross members (not shown) may be used. It is preferred that the meshwork or grid present as much open passage space as possible, e.g., 90 to 95 percent. Such a curved grid electrostatic focusing structure provides electrostatic focusing fields similar to those of curved plates 158; however, they have the advantage that ions deflected by the focusing means and directed towards such members 166 will in most cases pass therethrough along curved paths 167 to eventually impinge upon an adjoining collector plate 152. In this manner, losses of ions which might impinge on the electrostatic focusing electrodes is substantially minimized. With this type of focusing electrodes, it may be necessary to provide collector surfaces near support 154 between electrodes 152 to collect ions which might impinge on support 154. It will be appreciated that with large current densities the collector electrodes may require cooling by circulation of coolant media therethrough.

Focusing potentials and distributions as well as other parameters given in Example III apply to this arrangement also.

ELECTROSTATIC FOCUSING COLLECTOR. MODIFICATION B.

Figure 8:
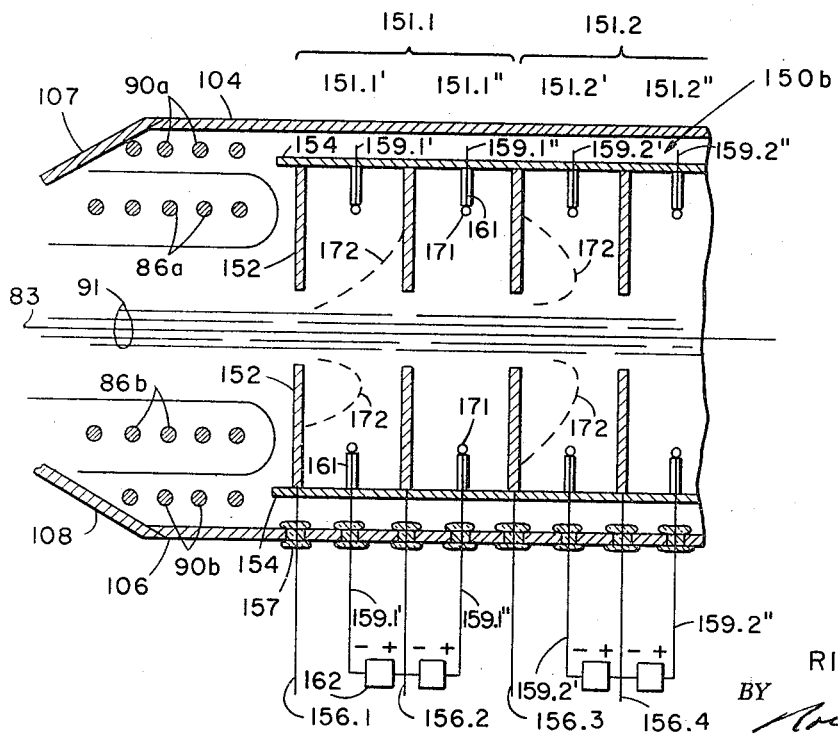
FIG. 8 is a partial vertical, sectional view of a second modification of the electrostatic focusing collector system embodiment of FIG. 6.

A second modification 150B of the second collector embodiment 150 is illustrated in FIG. 8 of the drawing. Modified electrostatic focusing collector assembly 150B is similar to assemblies 150, 150A, except that the curved electrode plate and grid members 158, 166 are replaced with a smaller diameter half-round or round conductor rod 171 disposed substantially deeper within the intervening spaces between collector plates 152. The electrostatic focusing fields provided with electrodes 171 are substantially similar to those obtained with electrode plates 158 and grids 166. However, ions deflected from ionic beam 91 may travel paths 172 which are substantially unobstructed by the focusing electrode structures. Moreover, as with grid electrodes 166, the ions are attracted more deeply into the space between collector plates 152 providing more favorable conditions for collections, i.e., the ions cannot easily reemerge to travel a retrograde path. With the foregoing arrangement potential distributions similar to the foregoing electrostatic focusing arrangements can be used. However, a commensurately high potential is required due to the greater separation of the electrodes from the beam.

$E \times B$ ENERGY SELECTIVE COLLECTOR ASSEMBLY

Figure 9:
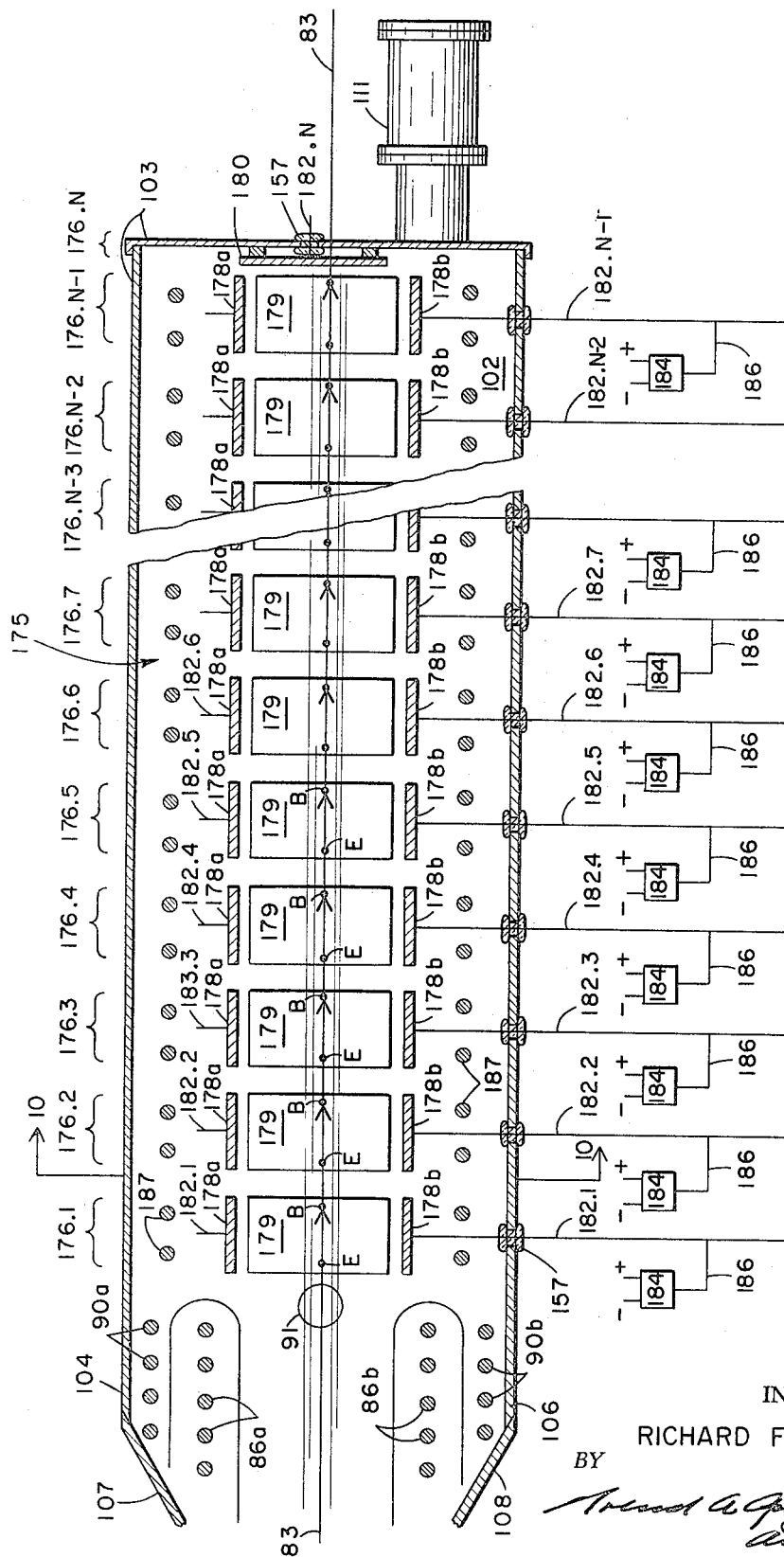
FIG. 9 is a vertical, longitudinal, sectional view of a third embodiment of the collector system utilizing an $E \times B$ field for selectively collecting the low residual energy ions of an ionic beam produced in the reactor-expander portions of the device of FIG. 1.
Figure 10:
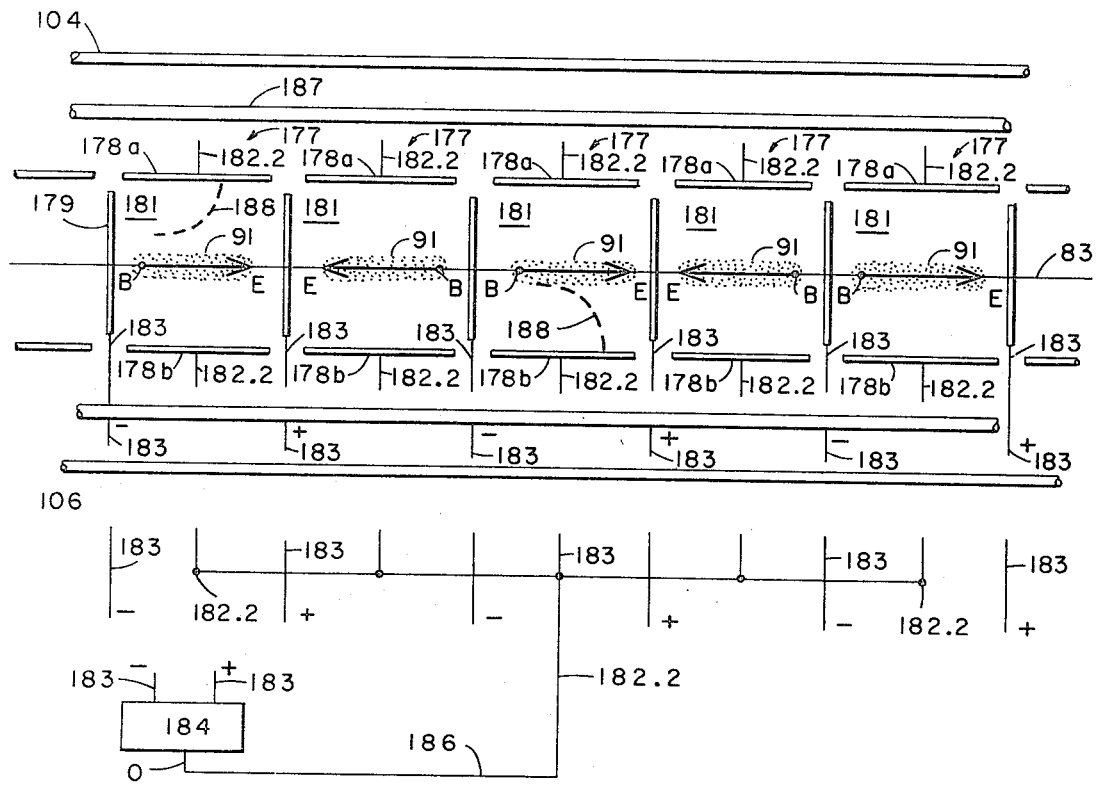
FIG. 10 is a transverse vertical sectional view of the device of FIG. 9.

In a third embodiment 175 of the collector assembly, illustrated in FIG. 9, a plurality, N, of collector stages 176.1, 176.2 - - - 176.N are arranged sequentially along the path of ionic beam 91 in chamber 102. Each of such stages comprises a plurality of constituent cubical cells 177 arranged arcuately along a uniform radial dimension of vessel 103 such that the stages of assembly 175 comprise concentric rows of cells 177 with the cells of successive stages in radial alignment outwardly along the path of beam 91 through vessel section 103. At the entrance end of this collector embodiment electrically energized conductors (not shown) may be positioned transversely to deflect the portions of the beam which would otherwise impinge on the leading edges of electrodes 179 described below. In effect the beam is sliced into narrow ribbons which travel through said cells. Each cell 177 comprises a pair of collector electrode plates 178a, 178b, disposed in spaced parallel relation above and below the path of beam 91 in spaced edge to edge relation in the aforesaid concentric rows. Plate electrodes 179 are arranged at right angles to plates 178a, 178b, in the spaces between the adjacent edges of plates 178a, 178b, in transecting relation across the path of beam 91. Plates 178a, 178b, with plates 179, thereby define a series of aligned rectangular cubical cellular spaces 181 of the successive stages 176 through which radial segments of the beam 91 pass. Such electrodes 177 may be supported in mutually insulated relation together with interconnected electrode plates 178a, 178b by a framework (not shown) mounted on the vessel walls as above. The last collector stage 176N may comprise a single collector plate 180 arranged to intercept the higher energy residual portions of the beam 91 remaining after collection of lower energy ions in previous stages.

Terminal leads 182.1, 182.2 - - - 182.N–1 may be connected to paired collector plates 178a, 178b, internally of vessel 103 and brought externally as a single joined conductor through feed-through insulator bushings 157 after delivering the collected current and for application of the retarding voltages as above. Potentials for creating an E field, i.e., $\rightarrow$, transverse to the direction of beam segment current flow in each cellular space 181 may be applied to terminal leads 183⁻, 183⁺, connected alternately to electrode plates 179 and lead externally of vessel 103 to be connected to the + and − terminals of a power supply 184. The power supply 184 is preferably one providing balanced + and − potentials with respect to a midpoint terminal which may be connected by a lead 186 to terminal lead 182.2. With this arrangement alternate plates 179 on each side of said cells are biased uniformly in balanced relation with respect to the retarding voltage applied to the collector plates 178a, 178b of said stages. Conductors 187 disposed in spaced parallel relation transversely across the path of beam 91 and having a curvature corresponding to that of vessel section 103 are energized from a D.C. power supply (not shown) to generate a magnetic field component $\rightarrow^B$ parallel to the path of beam 91.

In this manner an $E \times B$ field region is provided in each collector stage 176 to selectively deflect low energy ions, i.e., ions with a residual energy below the voltage increment between stages, from the beam 91, along curved paths, e.g., paths 188, to impinge upon collector plates 177 to generate an electrical current. The incrementally increased electrostatic retarding potentials are applied to terminals 182.1, 182.2 - - - 182.N–1 and electrical current generated by selective collection of the ionic beam components is withdrawn from terminals 182.1 to 182.N as described more fully hereinafter.

To achieve the foregoing selective deflection the E field should have a value of 400 volts/cm to about 800 volts/cm and the $\rightarrow^B$ field may have a value in the range of 200 gauss to about 500 gauss.

EXAMPLE IV

Illustrative parameters for an $E \times B$ collector system for a reactor-expander unit such as that set forth are as follows:

Arcuate sector occupied by

| | |
|---|---|
| collector system | ≈180° |
| Inner radius collector vessel | 100 meters |
| Beam ion energy (range) | 200 Kev to 1.5 Mev |
| Beam ion energy (mean) | 800 Kev |
| Incremental voltage increase per stage | 50 kilovolts |
| Ion energy range (1.5 Mev – 200 Kev) | 1300 Kev |
| Number of stages | 26 |
| Beam thickness in collector ($2h$) | ≈1 meter |
| Aperture between collector plates | 1 meter |
| Collector electrode length | 1 meter |
| Width between E electrodes 191 | 1 meter |
| E potential | 60 kilovolts |
| Separation between stages | ≈0.1–0.2 meter |
| Magnetic field intensity ($B$) | 300 gauss |

Collector losses estimated as low as 3 percent.

ELECTRICAL ENERGY OUTPUT-RETARDING POTENTIAL POWER SUPPLY CIRCUITRY

The electrical energy delivered by the various collector stages is in the form of direct current (D.C.) electrical power in which the voltage delivered ranges from that of the first stage ( - - - .1) to that of the last ( - - - .Nth) stage. The lowest voltage limit will, in general, be determined by the same operating parameter of the plasma, i.e., fusion reactor. Characteristically, the lower voltage limit may be determined by the plasma potential, i.e., ambipolar potential. Such may range from about 100 kilovolts to about 200 kilovolts and is effective to accelerate ions to equivalent energies which ions emerge from the plasma containment zone as a relatively low energy component of the plasma beam. The higher voltage limit is determined by the statistical spread of the ion energies in the plasma, plasma reaction temperature, etc. For example, with a reaction plasma temperature of 600 Kev, a significant proportion of the ions in the plasma may have an energy of the order of at least 1 Mev to as high as 1.5 Mev and appear in the plasma beam. For most efficient recovery it is apparent, from considerations noted hereinbefore, that the ions must be collected near their natural potential, i.e., the particular collector electrode at which the ions are collected, must have a retarding potential of a magnitude at which the ions are slowed substantially to a stop. In practice, the retarding potential increments may be of the order of about 5 kilovolts to about 15 kilovolts with 10 kilovolts being a reasonable increment. With a wide spread of energies, e.g., 200 to 1.5 Mev, wider voltage increments, e.g., up to 30 to 50 Kev or more, and fewer stages may be used with a correlative decrease in collection efficiency. Moreover, the upper and lower retarding potential limits may be selected to cover a practical range taking into consideration the number of collector stages required. For example, the number of stages may range from a minimum of about 20, i.e., $N = 20$, to about 100, i.e., $N = 100$, as determined by efficiency and construction economics, respectively. With a retarding potential increment of, e.g., 10 Kv, this would give charge sorting over a potential range of 200 Kev with 20 collector to 500 Kev with 50 sequential collector stages.

Figure 11:
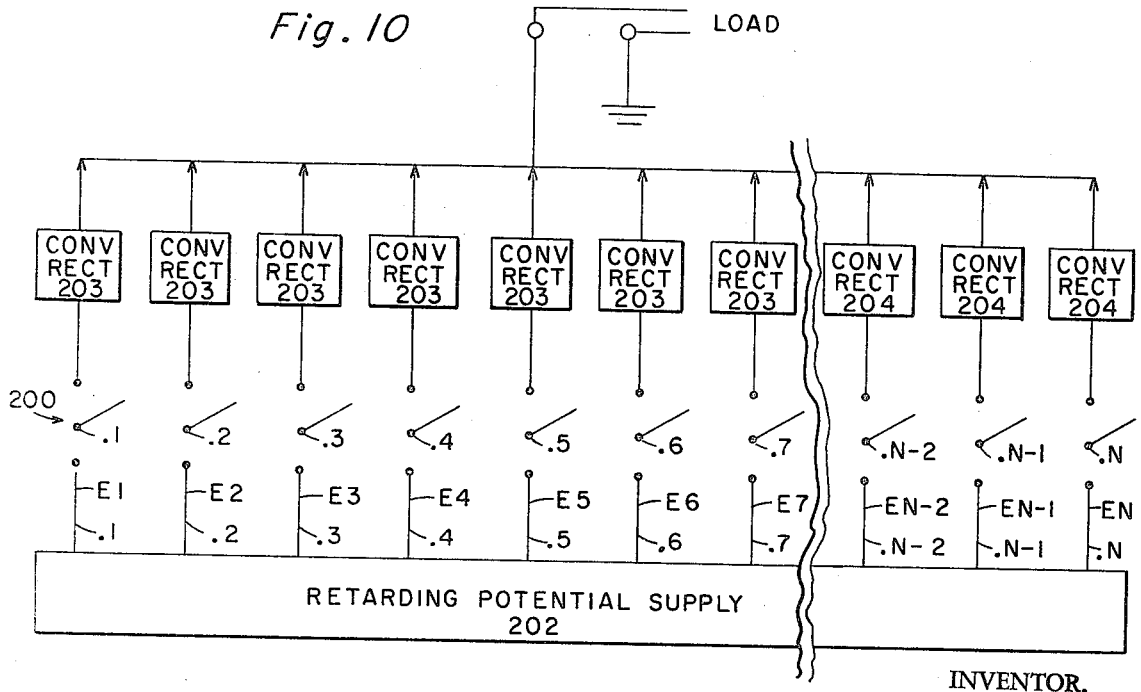
FIG. 11 is a schematic representation of circuitry for applying the incrementally increased retarding potentials to the collector stages and for removing the electrical current generated in said collector stages as well as for converting the collector current into a form suitable for distribution or use in a conventional system.

Circuitry for applying the incremental retarding potentials to the sequential stages of the respective collector embodiments, disclosed above, is shown in FIG. 11 of the drawing. More particularly, terminal leads 128$b$.1, 128$b$.2 - - - 128$b$.N−1 128.N of embodiment 125, FIG. 4, leads 156.1, 156.2 - - - 156.N−1, 156.N of embodiments 150, FIG. 5, 150A, FIG. 7, 150A, FIG. 8, or leads 182.1, 182.2 - - - 182.N−1, 182.N are connected to corresponding switching contacts .1, .2 - - - .N−1, .N of a single pole double throw gang switching means 200. One set of the stationary switching contacts of switching means 200 are connected to corresponding output terminals .1, .2 - - - .N−1, .N of a voltage divider circuit, of a direct current retarding potential power supply 202.

On startup, the gang switching means is switched to apply the retarding potential increment to said successive collector stages. However, as current collection begins, the switching means is actuated to connect the movable gang switch contacts to connect the collector stages to corresponding output terminals. The output terminals may be connected to supply the collected current to means appropriate for converting the several currents at different voltages produced by the collectors to a single voltage, $\bar{v}$, electrical output current suitable for delivery to an electrical distribution or utilization system of conventional design.

For example, if such distribution system is a high voltage D.C. distribution system, all collectors delivering a voltage less than the D.C. voltage $\bar{v}$ of the distribution system are connected to a series of converter-rectifier units 203. Units 203 include converter circuitry which raises the voltage of the power supplied by each of the lower voltage collectors to the common output level $\bar{v}$ together with a rectifier which reconverts such power to direct current at the same voltage. In the case of collectors delivering a power output at a voltage higher than the common output voltage, $\bar{v}$, the output of the collector is passed through a converter-rectifier unit 204. The unit 204 may include a converter circuit which converts the direct current of the collector output to a varying current which is then passed through a stepdown transformer and a rectifier to deliver the output at said common output voltage $\bar{v}$. It is preferred that multiphase converter-rectifier equipment, well known in the art, be used for the foregoing purpose since a substantially constant current-constant-voltage, i.e., nonvarying potential relation, will then prevail at the collectors. With single phase half-wave or full-wave rectifier or converter equipment the voltage at the collector would vary, resulting in disturbance of the collector voltage and collection of ions. By omitting the rectifiers of the stages a common alternating current output voltage would be produced, if desired.

It may be noted that the voltage actually handled by the converter-rectifiers 204 corresponds to the difference between the retarding or operating output voltages of the particular stage and the common voltage, $\bar{v}$, which leads to decreased conversion losses. The total power output, $P$, of the collector system will, of course, be the sum of the product of the retarding voltage, i.e., operating voltage $E_s$ of each stage with the output current, $I_s$, thereof, i.e., $$P = \Sigma (E_s I_s).$$

This value will differ from the total power delivered to the distribution system only by the small losses introduced by the converter-rectifier system which can be as low as about 1 percent.

While there has been described in the foregoing what may be considered to be preferred embodiments, modifications may be made therein within the skill of the art and it is intended to cover all such as fall within the scope of the appended claims.

What I claim is:

1. Apparatus for the direct conversion of high temperature plasma energy into electrical energy comprising, in combination:

plasma source means wherein a beam of energetic charged particles is discharged therefrom through a magnetic field region wherefor said charged particles have a rotational kinetic energy component $W\perp$, as well as a translational kinetic energy component, $W\parallel$, said particles having a distributed range of kinetic energies;

expander means arranged for the passage of said beam of energetic charged particles therethrough, said expander means including means for providing a magnetic field generally along the charged particle beam path therein, said magnetic field having a high intensity portion serving as a continuation of the magnetic field of said plasma source means and progressively decreasing in intensity along said beam path to a relatively low level at the exit of said expander, wherefor at least some of the rotational energy component, $W\perp$, of said particles is converted into translational energy, $W\parallel$, directed along said beam path;

collector means including a plurality of stages arranged sequentially along the path of said charged particle beam upon emergence from said expander means, each of said collector means having at least one electrode arranged in proximity to said beam path and adapted for application of an electrical potential thereto of a polarity effective to retard charged particles of said beam, said collector means stages also including energy level sensitive charged particle deflecting means effective for deflecting charged particles of a selected residual energy range from said beam to impinge upon a collector electrode in said stage; and means for applying progressively increasing retarding electrical potential increments to at least said one electrode of said sequentially arranged collector stages, said potential increments having a magnitude of the order of said selected residual energy range being effective to slow successive groups of initially higher kinetic energy charged particles to a residual energy within said selected energy range whereat said charged particle deflecting means is effective to deflect the particles having said selected residual energy to impinge upon said collector electrode to generate electrical current therein at a voltage substantially corresponding to the retarding potential thereon.

2. Apparatus as defined in claim 1 wherein said beam of charged particles comprises a plasma beam of energetic positive ions and electrons, wherein a means is provided between said expander means and said collector means for deflecting electrons from said beam, and said electrical potential effective to retard charged particles is a positive polarity potential.

3. Apparatus as defined in claim 2 wherein said plasma source means comprises a controlled fusion reactor including means for producing a magnetic field defining a zone for the containment of a high temperature plasma together with means for introducing and trapping fusionable light nuclides in said containment zone to form a high temperature plasma in said zone at a temperature and density at which an appreciable fusion reaction rate is attained and wherefrom said plasma beam emanates to discharge through said magnetic field region.

4. Apparatus as defined in claim 3 wherein said magnetic field defining the plasma containment zone includes at least one magnetic mirror field region, wherein said beam of energetic charged plasma particles is discharged through said magnetic mirror field region to enter said expander, and wherein means are provided for conducting and converting the electrical current generated in said collector electrode to a form appropriate for delivery to a distribution system.

5. Apparatus as defined in claim 4 including vacuum vessel means defining an evacuable chamber wherein said magnetic field defining said containment zone is established, said vacuum vessel means further including extensions thereof enclosing said expander and collector means, and vacuum pumping means for evacuating said evacuable chamber to a pressure of below about $10^{-6}$ mm Hg and the interior of said extensions of said vacuum vessel means to pressures below about $10^{-5}$ mm Hg.

6. Apparatus as defined in claim 5 wherein said fusionable light nuclides comprise at least one material selected from the group consisting of P, D, T, $He^3$ and $Li^6$ and the plasma temperature is in the range of about 30 Kev to above about 700 Kev.

7. Apparatus as defined in claim 5 wherein said magnetic mirror field region of said magnetic field defining a containment zone is a curved magnetic mirror field region and said plasma beam emerges therefrom along an angularly distributed fan-like path, wherein the expander and collector extensions of said vacuum vessel means have an annular arcuate configuration, and wherein said means disposed between said expander and collector means for deflecting electrons from said beam comprises a relatively abrupt diminishing intensity region of the magnetic field in said expander.

8. Apparatus as defined in claim 7 wherein said collector means comprises a plurality of charge exchange collector stages each including a first annular section plate electrode disposed to one side of said positively charged fan-like particle beam, a second annular section plate electrode disposed in coextensive opposing relation at the second side of said beam, and means for directing a medium, having a relatively high charge exchange cross section for positive ions of relatively lower energies in said beam, transversely across the path of said beam between said electrode plates, to undergo a preferential charge exchange reaction with relatively low residual kinetic particles in said beam and wherein the ion formed by charge exchange travels to impinge upon one of said plate electrodes serving as said collector electrode to generate an electrical current therein.

9. Apparatus as defined in claim 8 wherein said charge exchange medium is a material selected from the group consisting of Mg, Na and Li, having an enhanced selective cross-section for charge exchange below about 15 Kev, wherein means are provided for establishing a potential difference between said plate electrodes effective for collecting charged particles and electrons produced in said charge exchange reaction on said plate electrodes, and wherein the retarding potential increments applied to said collector stages are less than about 15 Kev.

10. Apparatus as defined in claim 7 wherein said collector means comprise a plurality of electrostatic focusing energy sensitive stages arranged sequentially along said positive particle beam path, said stages comprising first and second pairs of curved collector electrode plate electrodes mounted in edgewise opposing relation across the path of said positively charged particle beam at spaced concentric intervals therealong together with electrode means having convexly curved faces in juxtaposition across the beam path and disposed in symmetric relation with respect to the first paired electrode members and in the spaces between adjacent electrode pairs, said convexly curved electrodes being adapted for application of negative and positive focusing potentials relative to said first paired electrodes.

11. Apparatus as defined in claim 10 wherein said focusing potentials applied to said curved electrodes juxtaposed across the beam path are of like polarity.

12. Apparatus as defined in claim 11 wherein said focusing potentials applied to said curved electrodes juxtaposed across the beam path are of opposite polarity.

13. Apparatus as defined in claim 10 wherein said convexly curved electrode means comprise convexly curved conductor sheet members.

14. Apparatus as defined in claim 10 wherein said convexly curved electrode means comprise a convexly curved open gridwork or meshwork sheet electrode.

15. Apparatus as defined in claim 10 wherein said convexly curved electrode means comprises a circular bar electrode.

16. Apparatus as defined in claim 7 wherein said collector means comprises a plurality of $E \times B$ particle energy selective charged particle collector stages, said stages each comprising a plurality of paired first plate electrode members disposed in parallel coextensive spaced relation across said fan-like beam of positive particles and in sequential concentric rows therealong, second plate electrode members disposed at right angles to said first plate electrode members transecting said beam path and with said first plate electrode member, defining a plurality of cubical cells along said concentric rows, with the cells of said rows being in radial alignment, means for providing a magnetic field, $\rightarrow B$, along said beam path through said cubical cells, means for applying an electrostatic potential, $E$, between one pair of said plate electrodes disposed on opposite sides of said cell, wherefor an $E \times B$ field is established in said cell effective to divert selected low residual energy charged particles from said beam to impinge upon the second pair of electrodes to be collected thereon to generate an electrical current therein.

17. Apparatus as defined in claim 16 wherein electromagnetic deflection means are disposed at the entrance to the collector section to divide the fan-like positive particle beam into segments which are directed through said cubical cells.

* * * * *